(12) United States Patent
Kim et al.

(10) Patent No.: US 11,570,682 B2
(45) Date of Patent: Jan. 31, 2023

(54) METHOD AND APPARATUS FOR MOBILITY HANDLING IN WIRELESS COMMUNICATION SYSTEM

(71) Applicant: LG ELECTRONICS INC., Seoul (KR)

(72) Inventors: Hongsuk Kim, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 17/069,698

(22) Filed: Oct. 13, 2020

(65) Prior Publication Data

US 2021/0112475 A1    Apr. 15, 2021

(30) Foreign Application Priority Data

Oct. 14, 2019  (KR) .................. 10-2019-0127104

(51) Int. Cl.
*H04W 36/32*    (2009.01)
*H04W 36/00*    (2009.01)

(52) U.S. Cl.
CPC ....... *H04W 36/32* (2013.01); *H04W 36/0058* (2018.08); *H04W 36/0061* (2013.01); *H04W 36/00837* (2018.08)

(58) Field of Classification Search
USPC ......................................................... 370/331
See application file for complete search history.

(56) References Cited

U.S. PATENT DOCUMENTS

| | | |
|---|---|---|
| 10,321,382 B2 | 6/2019 | Teyeb et al. |
| 2014/0031041 A1* | 1/2014 | Jung ................. H04W 36/0085 455/437 |
| 2015/0056993 A1* | 2/2015 | Zhu ....................... H04W 60/04 455/435.1 |
| 2016/0285679 A1* | 9/2016 | Dudda ............... H04L 41/0672 |
| 2016/0330654 A1* | 11/2016 | Jung ................. H04W 36/0016 |
| 2017/0041880 A1* | 2/2017 | Ouchi ................... H04W 52/34 |
| 2017/0215078 A1* | 7/2017 | Mochizuki ............. H04W 4/06 |
| 2018/0352481 A1* | 12/2018 | Taguchi .............. H04W 36/023 |
| 2019/0223073 A1* | 7/2019 | Chen ................. H04W 36/0058 |
| 2020/0045602 A1 | 2/2020 | Jiang |
| 2020/0077288 A1* | 3/2020 | Tsuboi ............. H04W 36/0069 |
| 2021/0160798 A1* | 5/2021 | Zheng ............... H04W 36/0058 |
| 2022/0022121 A1* | 1/2022 | Eklof .................... H04W 36/32 |

FOREIGN PATENT DOCUMENTS

WO    2020/139015    7/2020

* cited by examiner

*Primary Examiner* — Gregory B Sefcheck
*Assistant Examiner* — Majid Esmaeilian
(74) *Attorney, Agent, or Firm* — Lee Hong Degerman Kang Waimey

(57) ABSTRACT

The present disclosure relates to a mobility handling in wireless communications. According to an embodiment of the present disclosure, a method performed by a wireless device comprises: identifying a first cell which satisfies a mobility condition for the first cell included in a conditional mobility command of the first cell; and based on a determination that a target cell configuration for the first cell is unavailable, transmitting a report comprising information for an unavailability of the target cell configuration for the first cell.

7 Claims, 19 Drawing Sheets

METHOD AND APPARATUS FOR MOBILITY HANDLING IN WIRELESS COMMUNICATION SYSTEM

CROSS-REFERENCE TO RELATED APPLICATIONS

Pursuant to 35 U.S.C. § 119 (a), this application claims the benefit of earlier filing date and right of priority to Korean Patent Application No. 10-2019-0127104, filed on Oct. 14, 2019, the contents of which are all hereby incorporated by reference herein in its entirety.

BACKGROUND OF THE DISCLOSURE

Field of the Disclosure

The present disclosure relates to a mobility handling in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In a wireless communication system, a wireless device and/or user equipment (UE) may move along cells/base stations deployed in a wide range of areas. If a serving cell quality degrades as the wireless device moves far away from the serving cell, the wireless device may perform a mobility from the serving cell to another cell. The mobility should be properly handled before and during a mobility procedure, and even after the mobility procedure.

SUMMARY OF THE DISCLOSURE

Technical Problem

An aspect of the present disclosure is to provide method and apparatus for a mobility handling in a wireless communication system.

Another aspect of the present disclosure is to provide method and apparatus for a mobility handling after completing a mobility procedure in a wireless communication system.

Another aspect of the present disclosure is to provide method and apparatus for handling an invalid scenario after performing a conditional mobility in a wireless communication system.

Another aspect of the present disclosure is to provide method and apparatus for preventing unnecessary actions after performing a conditional mobility in a wireless communication system.

Technical Solution

According to an embodiment of the present disclosure, a method performed by a wireless device comprises: identifying a first cell which satisfies a mobility condition for the first cell included in a conditional mobility command of the first cell; and based on a determination that a target cell configuration for the first cell is unavailable, transmitting a report comprising information for an unavailability of the target cell configuration for the first cell.

According to an embodiment of the present disclosure, a wireless device in a wireless communication system comprises: a transceiver; a memory; and at least one processor operatively coupled to the transceiver and the memory, and configured to: identify a first cell which satisfies a mobility condition for the first cell included in a conditional mobility command of the first cell, and based on a determination that a target cell configuration for the first cell is unavailable, control the transceiver to transmit a report comprising information for an unavailability of the target cell configuration for the first cell.

According to an embodiment of the present disclosure, a computer-readable medium having recorded thereon a program for performing each step of a method on a computer is provided. The method comprises: identifying a first cell which satisfies a mobility condition for the first cell included in a conditional mobility command of the first cell; and based on a determination that a target cell configuration for the first cell is unavailable, transmitting a report comprising information for an unavailability of the target cell configuration for the first cell.

Advantageous Effect

The present disclosure can have various advantageous effects.

For example, the present disclosure resolves to prevent unnecessary invalid handling when a mobility condition for a candidate target cell is met without the corresponding target cell configuration after successful mobility such as CHO. Also, the UE doesn't have to perform RRC re-establishment procedure which cause data interruption by invalid case handling.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
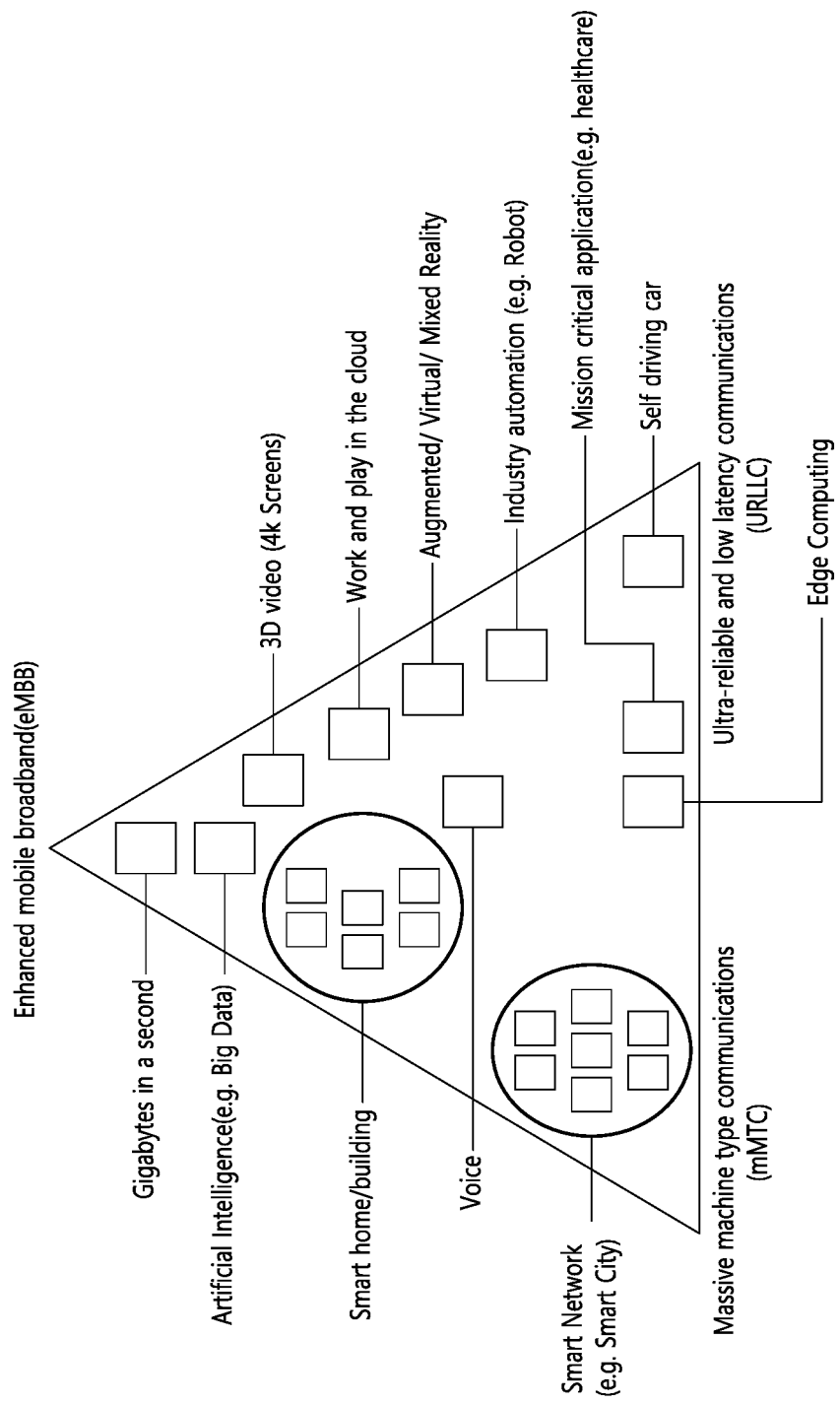
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

The terms used throughout the disclosure can be defined as the followings:

'Mobility' refers to a procedure for i)changing a PCell of a UE (i.e., handover or PCell change), ii)changing a PSCell of a UE (i.e., SN change or PSCell change), and/or iii)adding a PSCell for a UE (i.e., SN addition or PSCell addition). Therefore, the mobility may comprise at least one of a handover, an SN change or an SN addition. In other words, the mobility may comprise at least one of PCell change, PSCell change or PSCell addition. Throughout the disclosure, performing a mobility to a target cell may refer to applying a mobility command of the target cell or applying a target cell configuration for the target cell in the mobility command of the target cell. The target cell configuration for the target cell may comprise RRC reconfiguration parameters associated with the mobility to the target cell. Further, RRC reconfiguration and RRC connection reconfiguration may be used interchangeably.

'SN mobility' refers to a procedure for i)changing a PSCell of a UE (i.e., SN change or PSCell change), and/or ii)adding a PSCell for a UE (i.e., SN addition or PSCell addition). Therefore, the SN mobility may comprise at least one of an SN change or an SN addition. In other words, the SN mobility may comprise at least one of PSCell change or PSCell addition. Throughout the disclosure, performing an SN mobility to a target cell may refer to applying an SN mobility command of the target cell or applying a target cell configuration for the target cell in the SN mobility command of the target cell. The target cell configuration for the target cell may comprise RRC reconfiguration parameters associated with the SN mobility to the target cell. The SN mobility may be a kind of a mobility. The SN mobility command may comprise a SN change command for performing SN change, or SN addition command for performing SN addition.

'Mobility condition for a target cell' refers to a triggering condition for a mobility to the target cell. That is, the mobility condition for a target cell refers to a condition that should be satisfied for triggering a mobility to the target cell. Mobility condition may comprise at least one of an event, time-to-trigger (TTT), offset value, or threshold value(s). The mobility condition for an event may be satisfied if an entering condition for the event is satisfied for at least the TTT. For example, the entering condition for event A3 may be satisfied if a signal quality for a target cell is better than that for a source cell more than or equal to the offset value. For another example, the entering condition for event A5 may be satisfied if a signal quality for a target cell is better than a first threshold and a signal quality for a source cell is lower than a second threshold.

'SN mobility condition for a target cell' refers to a triggering condition for an SN mobility (i.e., SN addition or SN change) to the target cell. That is, the SN mobility condition for a target cell refers to a condition that should be satisfied for triggering an SN mobility to the target cell. SN mobility condition for a target cell may be classified as:

i) SN addition condition for a target cell, which refers to a triggering condition for an SN addition of the target cell; or ii) SN change condition for a target cell, which refers to a triggering condition for an SN change to the target cell.

SN mobility condition may comprise at least one of an event, time-to-trigger (TTT), offset value, or threshold value(s). The SN mobility condition for an event may be satisfied if an entering condition for the event is satisfied for at least the TTT.

For example, SN addition condition may be related to event A4 or event B1. The entering condition for event A4 or B1 may be satisfied if a signal quality for a target cell is better than a threshold.

For example, SN change condition may be related to event A3 or event A5. The entering condition for event A3 may be satisfied if a signal quality for a target cell is better than that for a source PScell more than or equal to the offset value. For another example, the entering condition for event A5 may be satisfied if a signal quality for a target cell is better than a first threshold and a signal quality for a source PScell is lower than a second threshold.

'Conditional mobility' refers to a mobility that is performed to a target cell which satisfies a triggering condition among a plurality of candidate target cells. Throughout the disclosure, performing a conditional mobility to a target cell may refer to applying a conditional mobility command of a target cell which satisfies a mobility condition for the target cell among a plurality of candidate target cells or applying a target cell configuration for the target cell in the conditional mobility command of the target cell which satisfies a mobility condition for the target cell among the plurality of candidate target cells. The target cell configuration for the target cell may comprise RRC reconfiguration parameters associated with the conditional mobility to the target cell.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', 'channel state/reference signal received power (RSRP)' and 'reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 2:
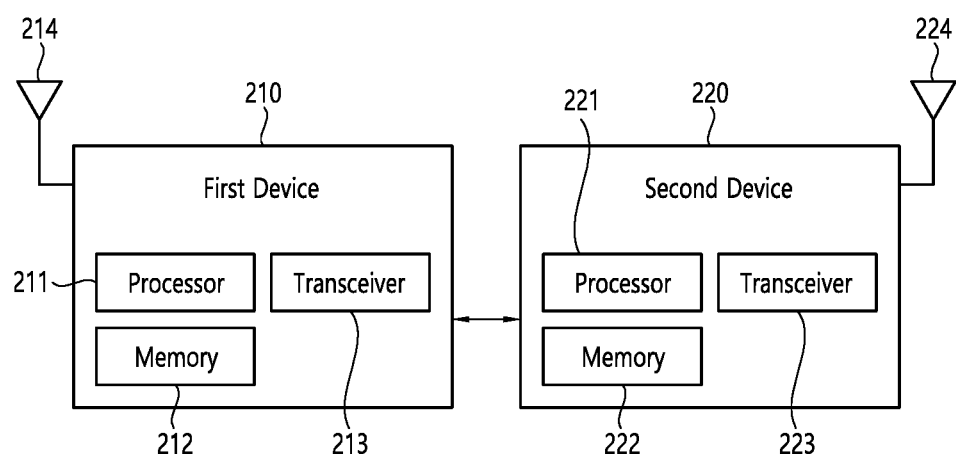
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
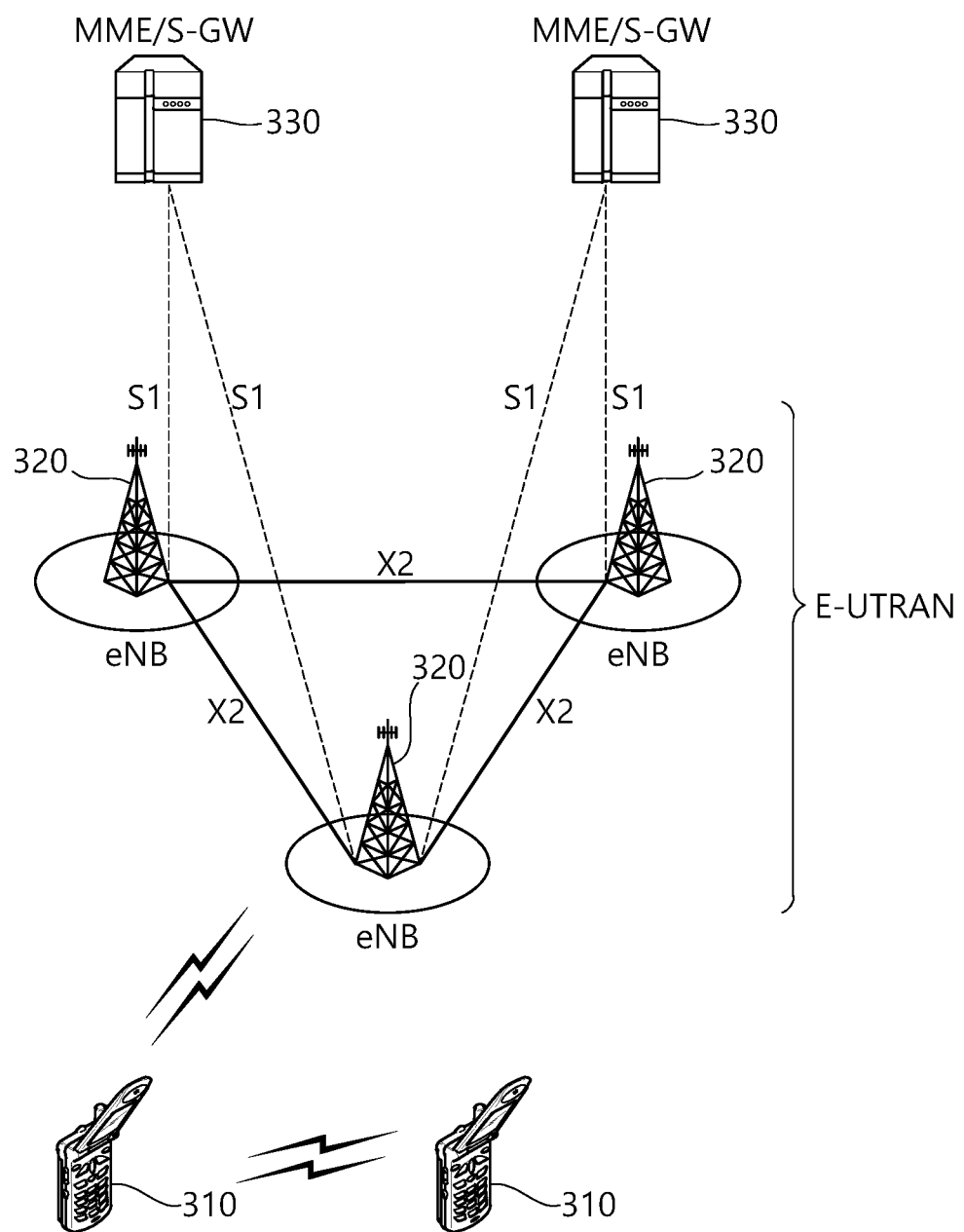
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The Si interface supports a many-to-many relation between MMEs/S-GWs and eNBs.

Figure 4:
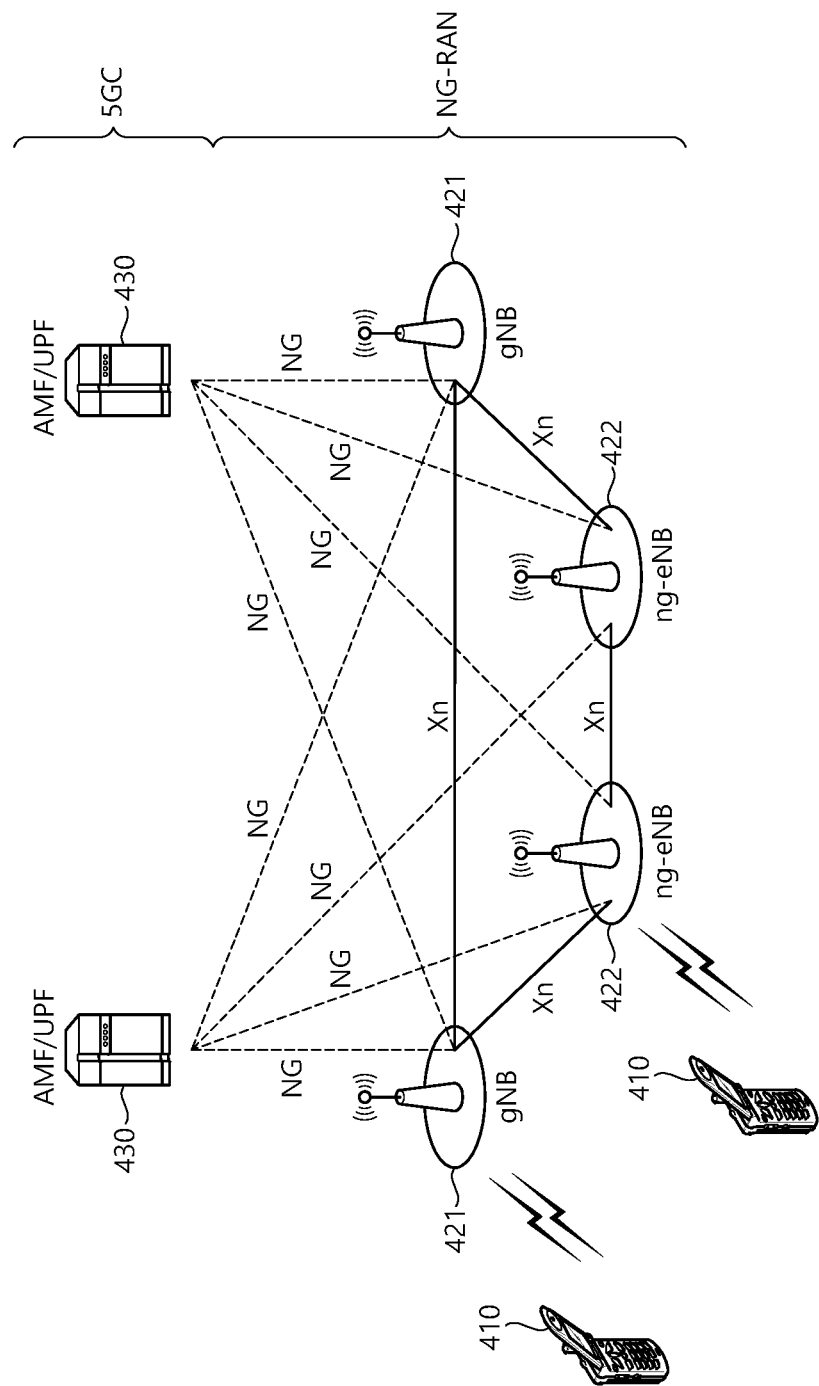
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
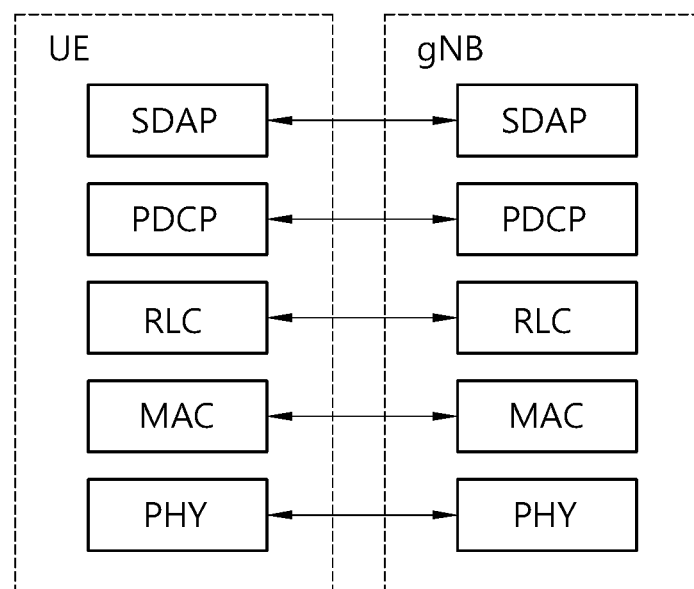
FIG. 5 shows a block diagram of a user plane protocol stack to which the technical features of the present disclosure can be applied.
Figure 6:
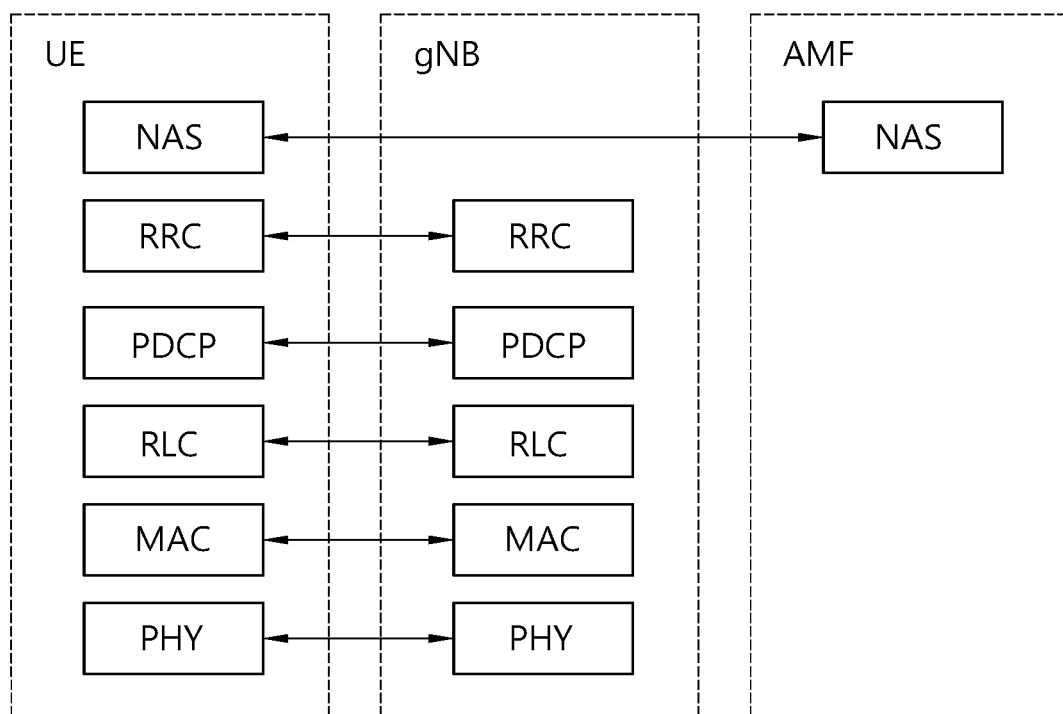
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
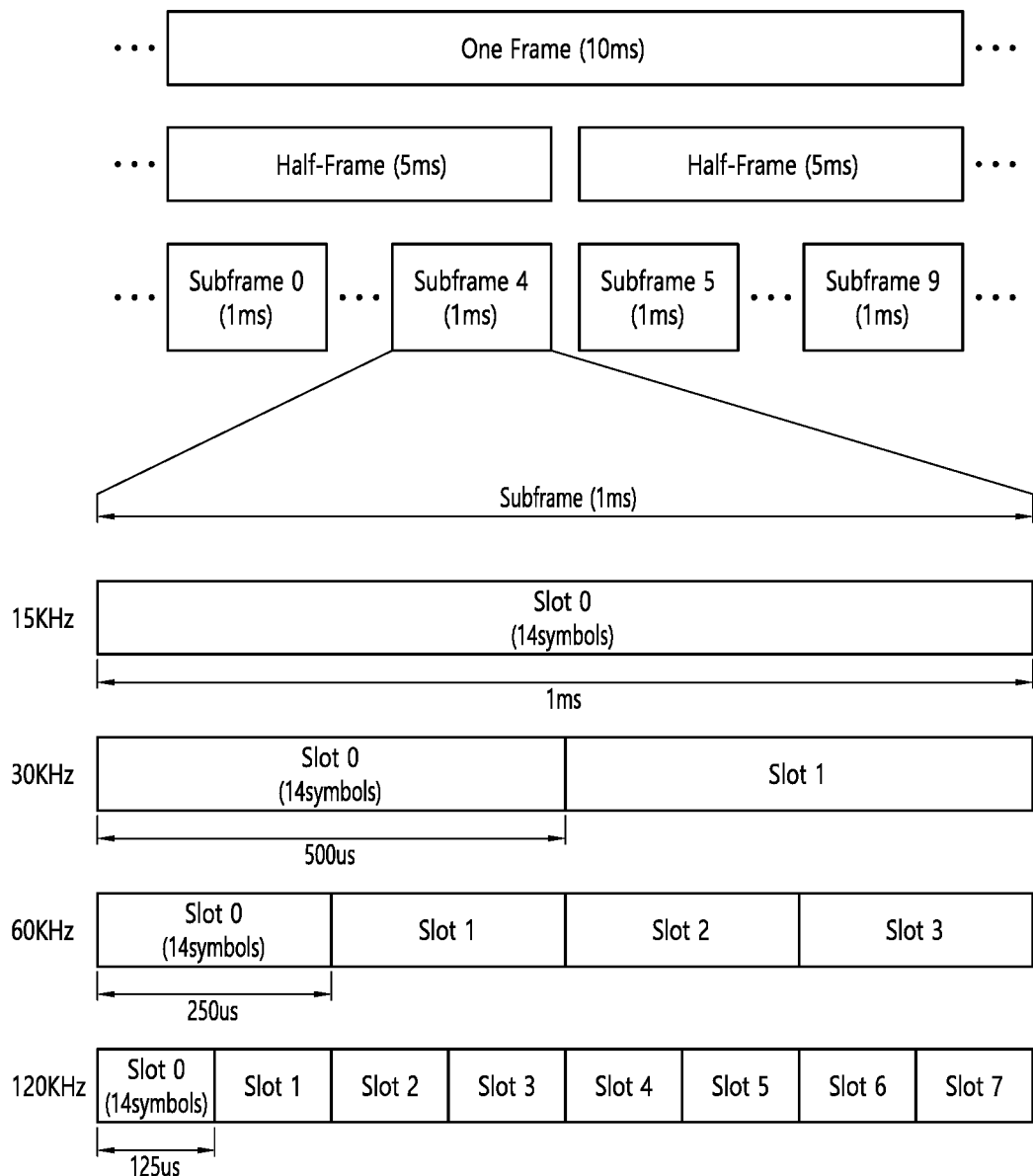
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2u * 15$ kHz. The following table shows the number of OFDM symbols per slot, the number of slots per frame, and the number of slots per for the normal CP, according to the subcarrier spacing $\Delta f = 2u * 15$ kHz.

TABLE 3

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing $\Delta f = 2u * 15$ kHz.

TABLE 4

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i-1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
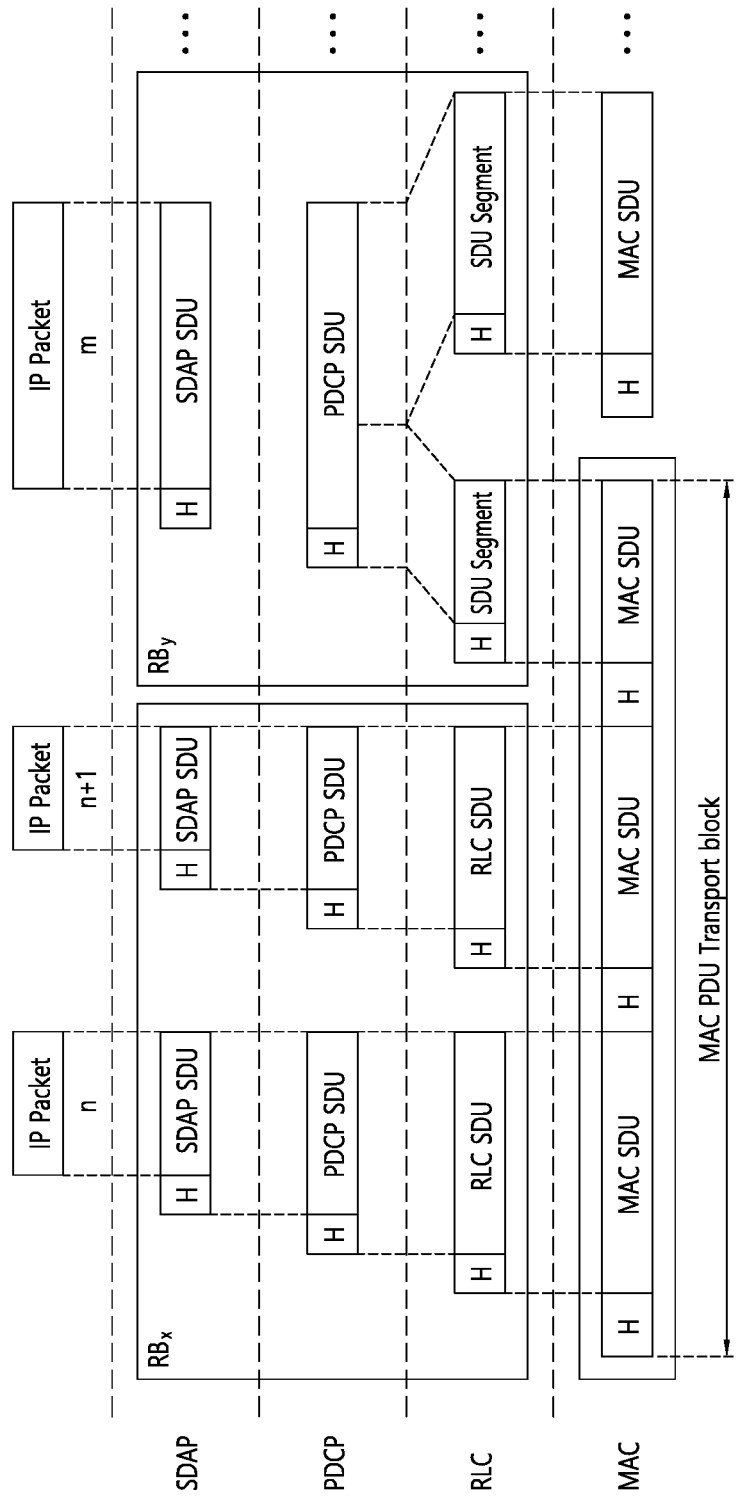
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
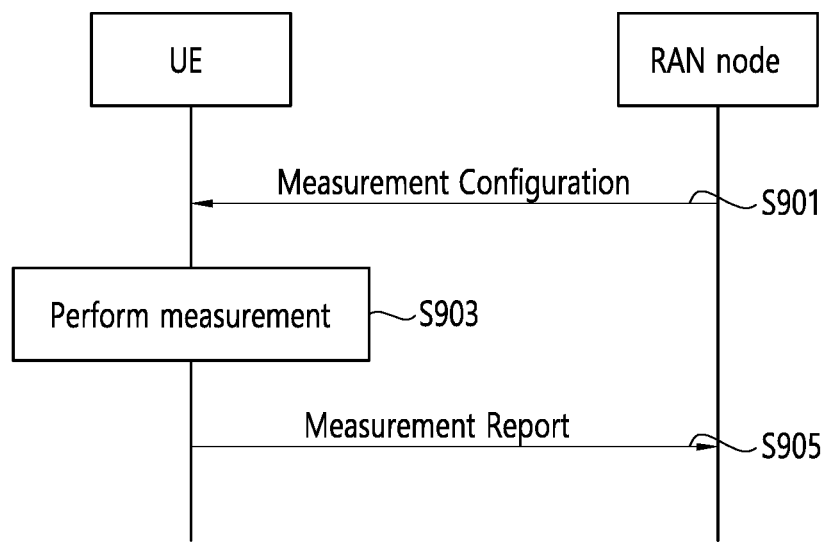
FIG. 9 shows an example of a method for a measurement and reporting to which technical features of the present disclosure can be applied.

FIG. 9 shows an example of a method for a measurement and reporting to which technical features of the present disclosure can be applied.

Referring to FIG. 9, in step S901, a UE may receive a measurement configuration from a RAN node. The measurement configuration may comprise a list of measurement objects (measObject), a list of report configurations (reportConfig), and a list of measurement identifiers ID, measID). The measurement ID may be related to/correspond to a combination of a measurement object and a report configuration. The measurement object may indicate object information regarding an object the UE is supposed to measure. For example, the object information may comprise a measurement frequency and/or a list of cells including serving cell/neighbor cell(s). The report configuration may comprise a condition to perform an action corresponding to a report type in the report configuration. For example, the condition may comprise a report condition that should be satisfied for the UE to transmit a measurement report. For another example, the condition may comprise a mobility condition that should be satisfied for the UE to perform a conditional mobility. If the report type is set to 'condTriggerConfig', the condition may be the mobility condition. The report type may also be referred to as a purpose of the condition.

In step S903, the UE may perform a measurement based on the measurement configuration. For example, the UE may measure the serving cell and/or the neighbor cell(s) on the measurement frequency specified by the measurement object, to obtain a measurement result for the serving cell and/or the neighbor cell(s). The measurement result may comprise a cell quality/signal strength/signal quality/channel quality/channel state/reference signal received power (RSRP)/reference signal received quality (RSRQ) of the serving cell and/or the neighbor cell(s).

In step S905, the UE may transmit a measurement report to the RAN node. The UE may transmit the measurement report comprising the measurement result for the serving cell and/or the neighbor cell(s) to the RAN node based on the report configuration (e.g., when the report condition is satisfied).

According to various embodiments, the report condition may comprise at least one of an event, time-to-trigger (TTT), offset value, or threshold value9s). The report condition for an event may be satisfied if an entering condition for the event is satisfied for at least the TTT. For example, the entering condition for event A1 may be satisfied if a cell quality of a serving cell becomes better than a threshold. The entering condition for event A2 may be satisfied if a cell quality of a serving cell becomes worse than a threshold. The entering condition for event A3 may be satisfied if a cell quality of a neighbor cell becomes better than that of a serving cell by an offset. The entering condition for event A4 may be satisfied if a cell quality of a neighbor cell becomes better than a threshold. The entering condition for event A5 may be satisfied if a cell quality of a serving cell becomes worse than a serving cell threshold, and a cell quality of a neighbor cell becomes better than a neighbor cell threshold.

According to various embodiments, the measurement configuration may comprise/be related to at least one of a measurement period, a measurement gap, or a measurement gap repetition period. The measurement period refers to a time spacing between two consecutive moments at which a measurement on a neighbor cell is performed and/or a cell quality of the neighbor cell is obtained. The measurement gap refers to a gap/time period during which no transmission and reception happens for the UE to measure a neighbor cell/inter-frequency. The measurement gap repetition period refers to a time interval in which successive measurement gaps repetitively occurs. In other words, the measurement gap repetition period refers to a time interval between successive measurement gaps.

Figure 10:
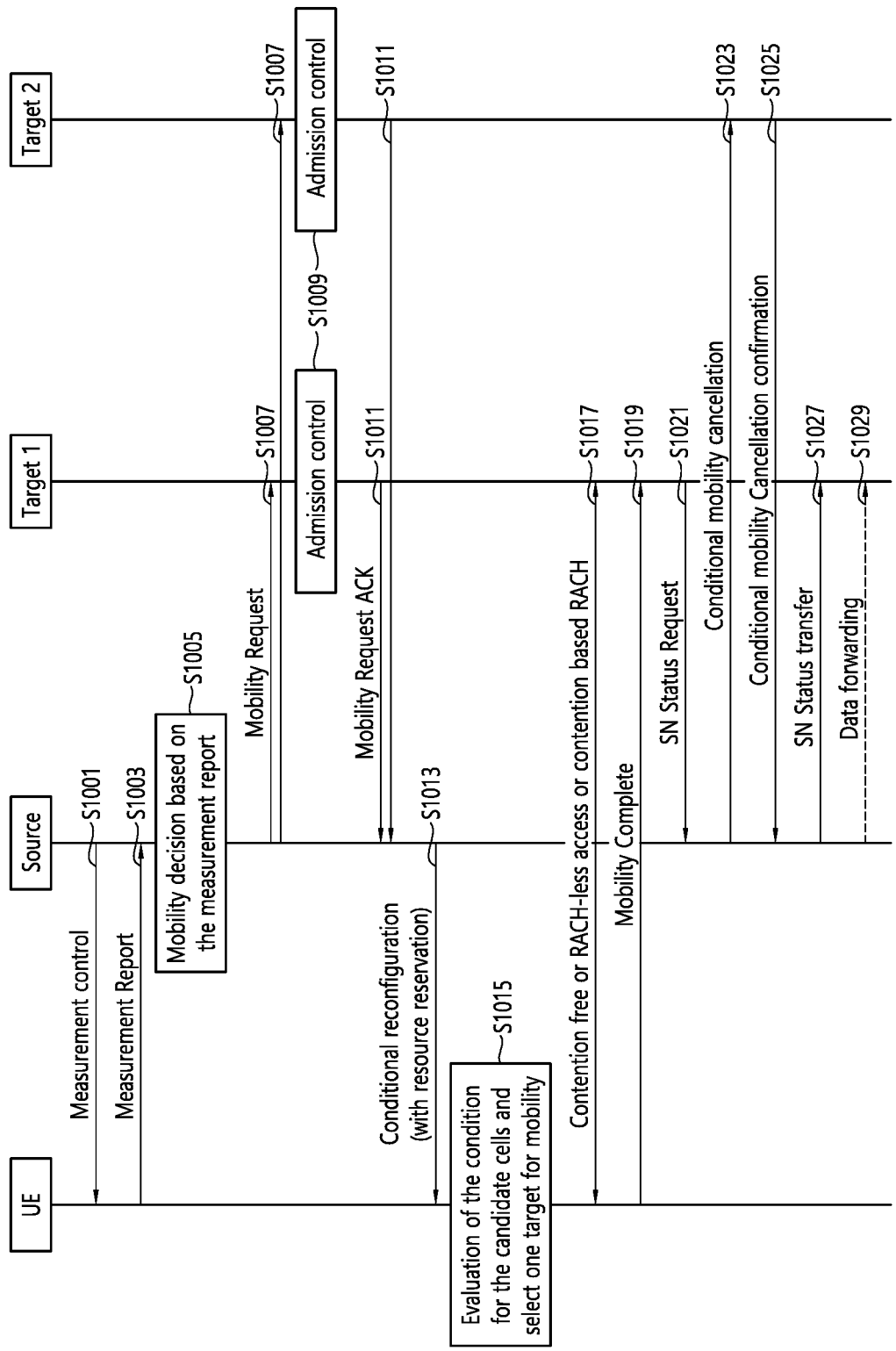
FIG. 10 shows an example of a conditional mobility procedure to which technical features of the present disclosure can be applied.

FIG. 10 shows an example of a conditional mobility procedure to which technical features of the present disclosure can be applied. The steps illustrated in FIG. 10 can also be applied to a conditional handover procedure, conditional SN addition procedure and/or conditional SN change procedure.

Referring to FIG. 10, in step S1001, the source cell may transmit measurement control message to the UE. The source cell may configure the UE measurement procedures according to the roaming and access restriction information and, for example, the available multiple frequency band information through the measurement control message. Measurement control information provided by the source cell through the measurement control message may assist the function controlling the UE's connection mobility. For example, the measurement control message may comprise measurement configuration and/or report configuration.

In step S1003, the UE may transmit a measurement report message to the source cell. The measurement report message may comprise a result of measurement on neighbor cell(s) around the UE which can be detected by the UE. The UE may generate the measurement report message according to a measurement configuration and/or measurement control information in the measurement control message received in step S1001.

In step S1005, the source cell may make a mobility decision based on the measurement report. For example, the source cell may make a mobility decision and determine candidate target cells (e.g., target cell 1 and target cell 2) for mobility among neighbor cells around the UE based on a result of measurement (e.g., signal quality, reference signal received power (RSRP), reference signal received quality (RSRP)) on the neighbor cells.

In step S1007, the source cell may transmit mobility request messages to the target cell 1 and the target cell 2 which are determined in step S1005. That is, the source cell may perform mobility preparation with the target cell 1 and the target cell 2. The mobility request message may comprise necessary information to prepare the mobility at the target side (e.g., target cell 1 and target cell 2).

In step S1009, each of the target cell 1 and the target cell 2 may perform an admission control based on information included in the mobility request message. The target cell may configure and reserve the required resources (e.g., C-RNTI and/or RACH preamble). The AS-configuration to be used in the target cell can either be specified independently (i.e. an "establishment") or as a delta compared to the AS-configuration used in the source cell (i.e. a "reconfiguration").

In step S1011, the target cell and the target cell 2 may transmit a mobility request acknowledge (ACK) message to the source cell. The mobility request ACK message may comprise information on resources reserved and prepared for a mobility. For example, the mobility request ACK message may comprise a transparent container to be sent to the UE as an RRC message to perform the mobility. The container may include a new C-RNTI, target gNB security algorithm identifiers for the selected security algorithms, a dedicated RACH preamble, and/or possibly some other parameters i.e. access parameters, SIBs. If RACH-less mobility is configured, the container may include timing adjustment indication and optionally a preallocated uplink grant. The mobility request ACK message may also include RNL/TNL information for forwarding tunnels, if necessary. As soon as the source cell receives the mobility request ACK message, or as soon as the transmission of the conditional mobility command is initiated in the downlink, data forwarding may be initiated.

In step S1013, the source cell may transmit a conditional reconfiguration to the UE. The conditional reconfiguration may be also referred to as (or, may comprise) conditional handover (CHO) configuration and/or a conditional mobility command (e.g., CHO command). The conditional configuration may comprise a conditional reconfiguration for each of the candidate target cells (e.g., target cell 1, target cell 2). For example, the conditional reconfiguration may comprise a conditional reconfiguration for the target cell 1, and a conditional reconfiguration for the target cell 2. The conditional reconfiguration for the target cell 1 may comprise a mobility condition for the target cell 1, and a target cell configuration for the target cell 1. The target cell configuration for the target cell 1 may comprise RRC reconfiguration parameters associated with a mobility to the target cell 1, including information on resources reserved for the mobility to the target cell 1. Similarly, the conditional reconfiguration for the target cell 2 may comprise a mobility condition for the target cell 2, and a target cell configuration for the target cell 2. The target cell configuration for the target cell 2 may comprise RRC reconfiguration parameters associated with a mobility to the target cell 2, including information on resources reserved for the mobility to the target cell 2.

The mobility condition may inform at least one measurement ID. For example, the mobility condition may inform at most 2 measurement IDs. If a mobility condition of a target cell informs a measurement ID which is related to a measurement object A and a report configuration B, evaluating the mobility condition may comprise determining whether a measurement result on the measurement object A satisfies a report condition in the report configuration B. If the measurement result on the measurement object A satisfies the report condition in the report configuration B according to the evaluation of the mobility condition, the UE may determine that the mobility condition of the target cell is satisfied (or, the target cell/measurement result for the target cell satisfies the mobility condition of the target cell), and perform a mobility to the target cell.

In step S1015, the UE may perform an evaluation of the mobility condition for the candidate target cells (e.g., target cell 1, target cell 2) and select a target cell for a mobility among the candidate target cells. For example, the UE may perform measurements on the candidate target cells, and determine whether a candidate target cell satisfies a mobility condition for the candidate target cell among the candidate target cells based on a result of the measurements on the candidate target cells. If the UE identifies that the target cell 1 satisfies a mobility condition for the target cell 1, the UE may select the target cell 1 as a target cell for the mobility.

In step S1017, the UE may perform a random access to the selected target cell (e.g., target cell 1). For example, the UE may transmit a random access preamble to the target cell 1, and receive a random access response comprising an uplink grant from the target cell 1. If RACH-less mobility is configured, the step S1017 may be omitted, and the uplink grant may be provided in step S1013.

In step S1019, the UE may transmit a mobility complete message to the target cell 1. When the UE has successfully accessed the target cell 1 (or, received uplink grant when RACH-less mobility is configured), the UE may transmit a mobility complete message comprising a C-RNTI to confirm the mobility, along with uplink buffer status report, whenever possible, to the target cell 1 to indicate that the mobility procedure is completed for the UE. The target cell 1 may verify the C-RNTI transmitted in the mobility complete message.

In step S1021, the target cell 1 may transmit a sequence number (SN) status request message to the source cell. The target cell 1 may request the source cell to inform the target cell 1 of a SN of a packet the target cell 1 has to transmit after the mobility, via the SN status request message.

In step S1023, the source cell may transmit a conditional mobility cancellation message to the target cell 2 which is not selected as a target cell for a mobility among the candidate target cells. After receiving the conditional mobility cancellation message, the target cell 2 may release resources that are reserved in case of a mobility.

In step S1025, the target cell 2 may transmit a conditional mobility cancellation confirmation message to the source cell, as a response for the conditional mobility cancellation message. The conditional mobility cancellation confirmation message may inform that the target cell 2 has released resources reserved in case of a mobility.

In step S1027, the source cell may transmit a SN status transfer message to the target cell 1, as a response for the SN status request message. The SN status transfer message may inform the target cell 1 of a SN of a packet the target cell 1 has to transmit after the mobility.

In step S1029, the source cell may perform a data forwarding to the target cell 1. For example, the source cell may forward data received from a core network to the target cell 1 so that the target cell 1 can now transmit the data to the UE.

According to various embodiments, the network may configure the UE with one or more candidate target SpCells in the conditional reconfiguration. The UE may evaluate the condition of each configured candidate target SpCell. The UE may apply the conditional reconfiguration associated with one of the target SpCells which fulfils associated execution condition. The network may provide the configuration parameters for the target SpCell in the Conditional-Reconfiguration information element (IE).

The UE may perform the following actions based on a received ConditionalReconfiguration IE:
1> if the ConditionalReconfiguration contains the condReconfigToRemoveList:
2> perform conditional reconfiguration removal procedure;
1> if the ConditionalReconfiguration contains the condReconfigAddModList (i.e., a list of conditional reconfigurations/conditional mobility commands):
2> perform conditional reconfiguration addition/modification.

For conditional reconfiguration removal, the UE shall:
1> for each condReconfigId (i.e., ID of conditional reconfiguration) value included in the condReconfigToRemoveList that is part of the current UE conditional reconfiguration in VarConditionalReconfig:
2> remove the entry with the matching condReconfigId from the VarConditionalReconfig.

The UE may not consider the message as erroneous if the condReconfigToRemoveList includes any condReconfigId value that is not part of the current UE configuration.

Conditional reconfiguration addition/modification is described as the followings. For each condReconfigId received in the condReconfigToAddModList IE the UE shall:
1> if an entry with the matching condReconfigId exists in the condReconfigToAddModList within the VarConditionalReconfig (i.e., a list of conditional reconfiguration(s) already stored in the UE):
2> if the entry in condReconfigToAddModList includes an condExecutionCond (i.e., mobility condition);
3> replace the entry with the value received for this condReconfigId;
2> else:
3> keep the stored condExecutionCond as the target candidate configuration for this condReconfigId;
2> if the entry in condReconfigToAddModList includes an condRRCReconfig (i.e., target cell configuration):
2> replace the entry with the value received for this condReconfigId;
2> if the entry in condReconfigToAddModList does not include an condRRCReconfig;
3> keep the stored condRRCReconfig as the target candidate configuration for this condReconfigId;
1> else:
2> add a new entry for this condReconfigId within the VarConditionalReconfig;
1> perform conditional reconfiguration evaluation.

For conditional reconfiguration evaluation, the UE shall:
1> for each condReconfigId within the VarConditionalReconfig:
2> consider the cell which has a physical cell identity matching the value indicated in the ServingCellConfigCommon included in the reconfigurationWithSync in the received condRRCReconfig to be applicable cell;
2> for each measId included in the measIdList within VarMeasConfig indicated in the condExecutionCond associated to condReconfigId:
3> if the entry condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:
4> consider the event associated to that measId to be fulfilled;

3> if the leaving condition(s) applicable for this event associated with the condReconfigId, i.e. the event corresponding with the condEventId(s) of the corresponding condTriggerConfig within VarConditionalReconfig, is fulfilled for the applicable cells for all measurements after layer 3 filtering taken during the corresponding timeToTrigger defined for this event within the VarConditionalReconfig:

4> consider the event associated to that measId to be not fulfilled;

2> if event(s) associated to all measId(s) within condTriggerConfig for a target candidate cell within the stored condRRCReconfig are fulfilled:

3> consider the target candidate cell within the stored condRRCReconfig, associated to that condReconfigId, as a triggered cell;

3> initiate the conditional reconfiguration execution.

Up to 2 MeasIds can be configured for each condReconfigId. The conditional handover event of the 2 MeasIds may have the same or different event conditions, triggering quantity, time to trigger, and triggering threshold.

For conditional reconfiguration execution, the UE shall:

1> if more than one triggered cell exists:

2> select one of the triggered cells as the selected cell for conditional reconfiguration execution;

1> for the selected cell of conditional reconfiguration execution:

2> apply the stored condRRCReconfig of the selected cell and perform a mobility to the selected cell.

If multiple NR cells are triggered in conditional reconfiguration execution, which one to select among the triggered cells for execution may be based on UE implementations. For example, the UE may consider beams and beam quality to select one of the triggered cells for execution.

According to various embodiments, a list of conditional reconfigurations may be received via ConditionalReconfiguration message. The list of conditional reconfiguration may contain the following information as shown in table 5:

TABLE 5

```
-- ASN1START
-- TAG-CONDRECONFIGTOADDMODLIST-START
CondReconfigToAddModList-r16 ::= SEQUENCE (SIZE (1.. maxNrofCondCells-r16)) OF
CondReconfigToAddMod-r16
CondReconfigToAddMod-r16 ::=   SEQUENCE {
    condReconfigId-r16          CondReconfigId-r16,
    condExecutionCond-r16           SEQUENCE (SIZE (1..2)) OF MeasId
OPTIONAL,      -- Cond condReconfigAdd
    condRRCReconfig-r16             OCTET STRING (CONTAINING
RRCReconfiguration)        OPTIONAL,  -- Cond condReconfigAdd
    ...
}
-- TAG-CONDRECONFIGTOADDMODLIST-STOP
-- ASN1STOP
```

According to table 5, CondReconfigToAddModList (i.e., list of conditional reconfigurations) may be a list of CondReconfigToAddMod (i.e., conditional reconfiguration). Each CondReconfigToAddMod may comprise CondReconfigId (i.e., ID of conditional reconfiguration), condExecutionCond (i.e., mobility condition), and condRRCReconfig (i.e., target cell configuration). The condExecutionCond may be an execution condition that needs to be fulfilled in order to trigger the execution of the conditional reconfiguration. At most 2 measurement IDs may be related to/correspond to the condExecutionCond. The condRRCReconfig may be an RRCReconfiguation message to be applied when the condition(s) are fullfied.

In the present disclosure, various timers can be defined for a mobility and/or a conditional mobility. For example, T304 timer and T310 timer may be defined. When the UE starts and/or stops the timer and what the UE performs at the expiry of the timer are described in table 6 below:

TABLE 6

| Timer | Start | Stop | At expiry |
|---|---|---|---|
| T304 | Upon reception of RRCReconfiguraition message including reconfigurationWithSync or upon conditional reconfiguration execution i.e. when applying a stored | Upon successful completion of random access on the corresponding SpCell For T304 of SCG, upon SCG release | For T304 of MCG, in case of the handover from NR or intra-NR handover, initiate the RRC re-establishment procedure; In case of handover to NR, perform the actions defined in the specifications applicable for |

TABLE 6-continued

| Timer | Start | Stop | At expiry |
|---|---|---|---|
| | RRCReconfiguration message including reconfigurationWithSync. | | the source RAT. If any DAPS bearer is configured and if there is no RLF in source PCell, initiate the failure information procedure. For T304 of SCG, inform network about the reconfiguration with sync failure by initiating the SCG failure information procedure. |
| T310 | Upon detecting physical layer problems for the SpCell i.e. upon receiving N310 consecutive out-of-sync indications from lower layers. | Upon receiving N311 consecutive in-sync indications from lower layers for the SpCell, upon receiving RRCReconfiguration with reconfigurationWithSync for that cell group, upon reception of MobilityFromNRCommand, upon the reconfiguration of rlf-TimersAndConstant, upon initiating the connection re-establishment procedure, and upon initiating the MCG failure information procedure. Upon SCG release, if the T310 is kept in SCG. | If the T310 is kept in MCG: If AS security is not activated: go to RRC_IDLE else: initiate the MCG failure information procedure or the connection re-establishment procedure or declare a radio link failure (RLF) if any DAPS bearer is configured. If the T310 is kept in SCG, Inform E-UTRAN/NR about the SCG radio link failure by initiating the SCG failure information procedure. |

According to various embodiments, the UE shall not stop T310 timer and shall not start T304 timer when the UE receives a configuration of CHO candidate (i.e., when the UE receives one or more conditional mobility commands). The T310 timer may be stopped and the T304-like timer (or, T304 timer) may be started when the UE begins execution of a conditional mobility for a target cell. That is, the T304-like timer (or, T304 timer) may be started upon/after initiating the conditional mobility to the target cell, and/or started upon/after determining that a mobility condition for the target cell is satisfied.

According to various embodiments, at RLF, the UE may perform a cell selection, and if the selected cell is a conditional mobility candidate (i.e., a cell which is configured for conditional mobility), then the UE may attempt to perform a conditional mobility execution; otherwise, RRC connection re-establishment may be performed.

At legacy mobility failure (i.e., T304 timer expiry) or failure to access a first conditional mobility candidate cell (i.e., T304-like timer expiry), the UE may perform a cell selection and if the selected cell is a second conditional mobility candidate cell, then the UE may attempt to perform a conditional mobility execution; otherwise, RRC connection re-establishment may be performed. The first conditional mobility candidate cell and the second conditional mobility candidate cell may be the same, or different from each other.

Figure 11A:
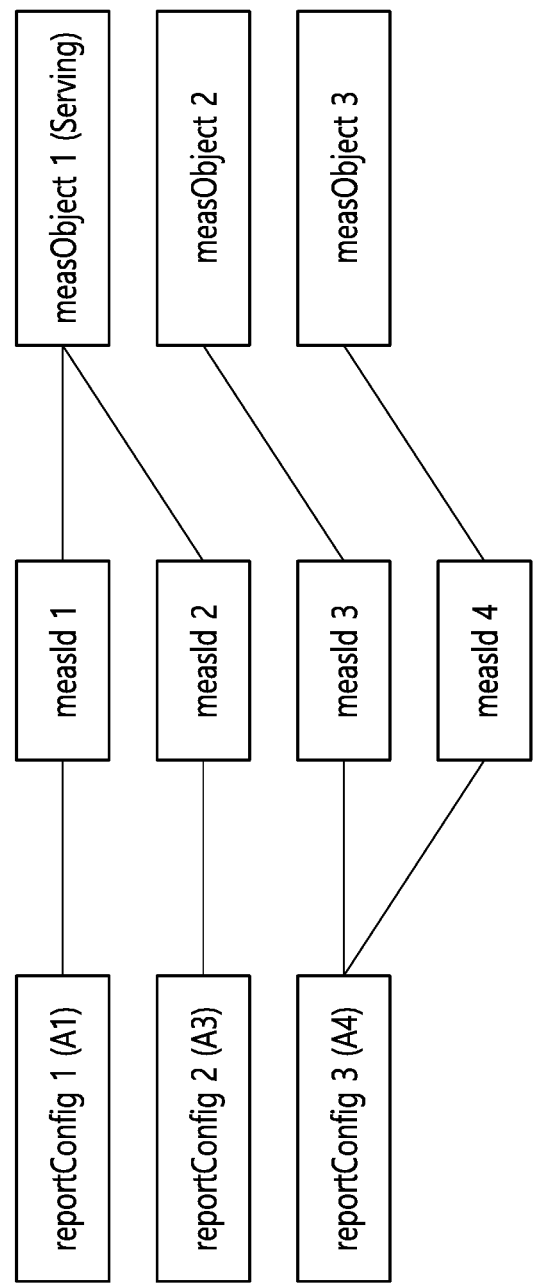
FIGS. 11A, 11B and 11C show an example of a measurement ID swapping to which technical features of the present disclosure can be applied.
Figure 11B:
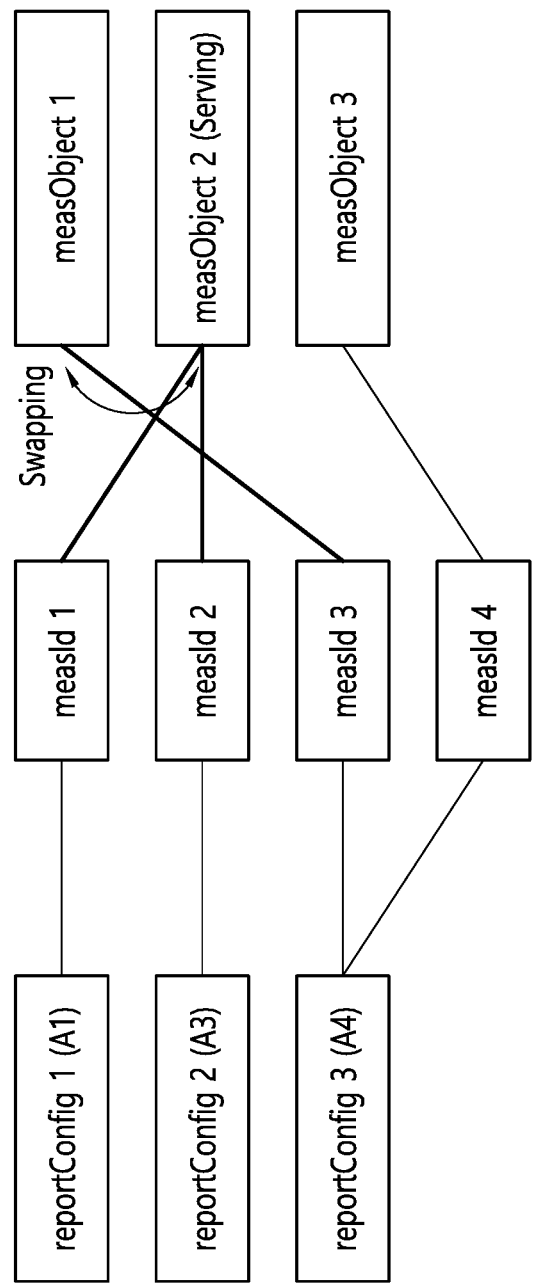
Figure 11C:
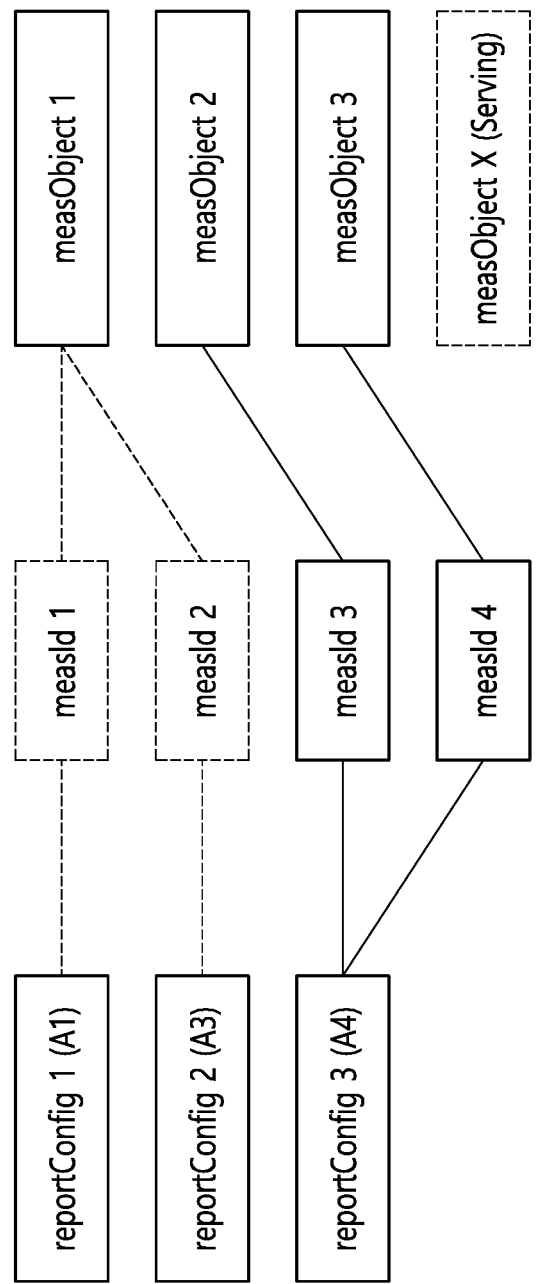

FIGS. 11A, 11B and 11C show an example of a measurement ID swapping to which technical features of the present disclosure can be applied.

Measurement ID swapping may be performed upon inter-frequency mobility/handover and/or RRC re-establishment.

In FIG. 11A, the state before inter-frequency mobility/handover/re-establishment is shown. The UE may perform inter-frequency measurements on measObject 2 and 3. Since measurement gaps are being used to measure measObject 2 and 3, event A1 may also be configured on the serving frequency (measObject 1) so that when the serving cell quality improves, measurement gaps can be stopped.

If inter-frequency mobility/handover/re-establishment is performed towards measObject 2, measurement ID swapping may be performed as shown in FIG. 11B, since the measObject corresponding to the mobility/handover target already existed (measObject 2 in this case). However, as shown in FIG. 11C, if inter-frequency mobility/handover/re-establishment is performed towards an inter-frequency for which no measObject has been configured (measObject X in FIG. 11C), measId's previously linked to the serving frequency (measObject 1) may be implicitly removed.

Any measurement configuration received within the mobility/handover command or the first reconfiguration after re-establishment may be processed after performing the implicit swapping/removal of the measID(s).

A conditional handover (CHO) is being introduced to avoid a handover failure that may happen due to, for example, a reception of handover failure. In a conditional handover, a UE may receive a CHO command prior to actual handover timing so as to increase the probability of success handover. The CHO command may include CHO execution condition(s) and target cell configuration(s) each of which corresponds to different target cell(s) respectively. After receiving the CHO command, the UE may evaluate CHO execution condition. If at least one target cell satisfies the CHO execution condition, the UE may initiate access to the corresponding target cell using the target cell configuration for the corresponding target cell. For a conditional handover, more than one target cell can be prepared for the handover. In case of preparation of multiple target cells for CHO, a UE may receive a CHO command including multiple target cell configurations corresponding to the prepared target cells.

It has been discussed whether the UE keeps the CHO command after HO complete to one of the candidate cells and how to design the CHO configuration (i.e., how to specify CHO configuration). For example, measurement identity (MeasId) may be reused as an execution condition to perform CHO, and the purpose of measId may be added to the report configuration which is linked to the measId. That is, UE may perform CHO when report condition which is linked to a measId is met. The purpose of the report condition may also be set to CHO execution.

However, the UE may perform additional actions related to measurement handling after handover completion in which measurement objects which are linked to the measId are swapped and/or are released to prevent inappropriate measurement procedure. Thus, if the measId is reused as a CHO execution condition, the UE may not be likely to release the measurement configuration for the CHO even though the UE should release the CHO configuration after handover complete. Then the measId(s) may remain in the measurement configuration so that unnecessary events of conditions can be met without target cell configuration.

Furthermore, there would be an additional configuration failure scenario if the the CHO configuration is kept after handover complete. When the UE swapped the measId, the swapped measID may correspond to CHO execution condition for CHO from the target frequency to the source frequency after CHO complete. That is, the executed CHO condition may become a new CHO execution condition for the source frequency which may cause fall-back handover to the source cell in the near future. Then if a new CHO execution condition for the source frequency is met before receiving an updated CHO command from the network, there may be an ambiguity scenario that a CHO execution condition that doesn't have a valid target cell configuration for mobility is met. This error case scenario may be worse if the UE is able to support the enhanced CHO failure handling. For example, the UE can retry the CHO procedure to other candidate cell after failure of the CHO trial, if there are multiple candidate cells for the CHO command and a newly selected cell is in the list of the candidate cells after the CHO failure. Whenever the UE fails to perform the CHO to a candidate cell, the UE may exclude the target cell configuration for the corresponding candidate cell, but the UE may keep the corresponding measurement configuration. Therefore, a way of avoiding ambiguous scenario which may cause invalid configuration handling should be needed.

According to various embodiments of the present disclosure, upon/after successful mobility (e.g., CHO) complete, the UE may be able to handle the invalid scenario that the UE doesn't have a target cell configuration for performing a mobility to the target cell when the corresponding mobility execution condition is met. For example, in a scenario that the UE doesn't have a target cell configuration for performing a mobility to the target cell when the corresponding mobility execution condition is met, the UE may:

1) apply a previous version of the target cell configuration for the mobility when the target cell configuration is not available but the UE has any previous version of the target cell configuration; and/or 2) report measurement results and/or transmit a measurement report to indicate that the UE is ready to perform a mobility to a cell but there is no available target cell configuration for the cell.

Figure 12:
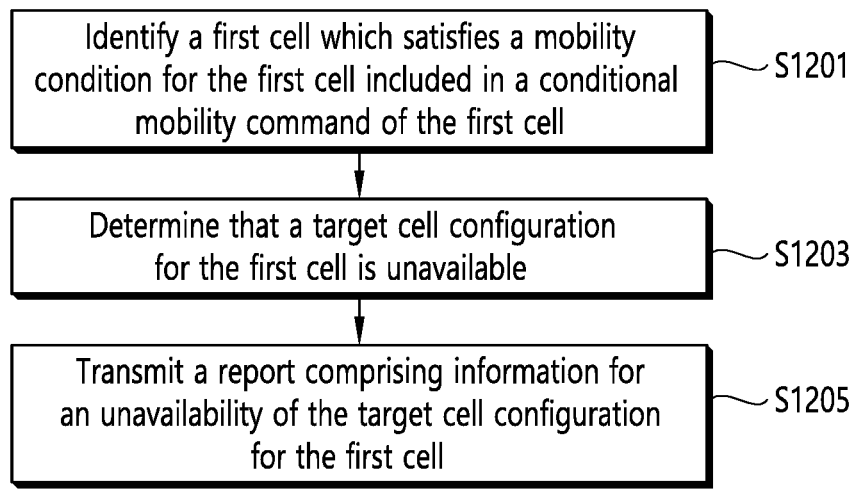
FIG. 12 shows an example of a method for handling a conditional mobility command after performing a conditional mobility according to an embodiment of the present disclosure.

FIG. 12 shows an example of a method for handling a conditional mobility command after performing a conditional mobility according to an embodiment of the present disclosure. Steps illustrated in FIG. 12 may be performed by a wireless device and/or a UE.

Referring to FIG. 12, in step S1201, the wireless device may identify a first cell which satisfies a mobility condition for the first cell included in the conditional mobility command of the first cell. The wireless device may identify that the first cell and/or a measurement result on the first cell satisfied the mobility condition for the first cell.

In step S1203, the wireless device may determine that a target cell configuration for the first cell is unavailable. When the wireless device can determine that the target cell configuration for the first cell is unavailable will be described later.

In step S1205, after/based on a determination that the target cell configuration for the first cell is unavailable, the wireless device may transmit a report comprising information for an unavailability of the target cell configuration for the first cell. The information may indicate that the target cell configuration for the first cell is unavailable. For example, the report may be transmitted via a measurement report, which may include measurement result(s) on one or more cells.

According to various embodiments, the wireless device may receive conditional mobility commands of target cells. Each of the conditional mobility commands may be related to each of the target cells, and the conditional mobility commands may comprise a conditional mobility command of a second cell among the target cells. The wireless device may perform a mobility to the second cell by applying a target cell configuration for the second cell in the conditional mobility command of the second cell, before identifying the first cell and transmitting the report. The steps S1201 to S1205 may be performed while the wireless device is being served by the second cell as a serving cell.

According to various embodiments, after performing the mobility to the second cell, the wireless device may transmit the report based on a determination that the first cell satisfies the mobility condition for the first cell, and the target cell configuration for the first cell is unavailable.

According to various embodiments, based on identifying that a mobility condition for the second cell is satisfied, the wireless device may perform the mobility to the second cell. For example, the wireless device may evaluate the mobility condition for the second cell based on a measurement result on the second cell and/or may determine whether the mobility condition for the second cell is satisfied based on a measurement result on the second cell. The wireless device may identify that the mobility condition for the second cell is satisfied according to the evaluation. The mobility condition for the second cell may be included in the conditional mobility command of the second cell.

According to various embodiments, the mobility condition for the second cell may become the mobility condition for the second cell according to a measurement identity swapping after performing the mobility from the first cell to the second cell. The target cell configuration for the first cell may be determined as being unavailable based on that the mobility is performed from the first cell to the second cell.

According to various embodiments, the conditional mobility commands may comprise the conditional mobility command of the first cell among the target cells. The wireless device may initiate the mobility to the first cell, and start a timer (e.g., T304 timer or T304-like timer) based on/upon/after identifying that the mobility condition for the first cell is satisfied. After/upon an expiry of the timer (that is, if the mobility to the first cell is not succeed while the timer is running and the timer expires), the wireless device may remove the target cell configuration for the first cell and performing a cell selection. The wireless device may perform the mobility to the second cell based on identifying that a cell to which the cell selection is performed is identical to the second cell.

According to various embodiments, the target cell configuration for the first cell may be determined as being unavailable based on that the target cell configuration for the first cell has been removed.

According to various embodiments, the wireless device may perform mobility to the first cell by applying a stored target cell configuration for the first cell based on a determination that the target cell configuration for the first cell is unavailable. The stored target cell configuration for the first cell may not be obtained by the conditional mobility command of the first cell.

Figure 13:
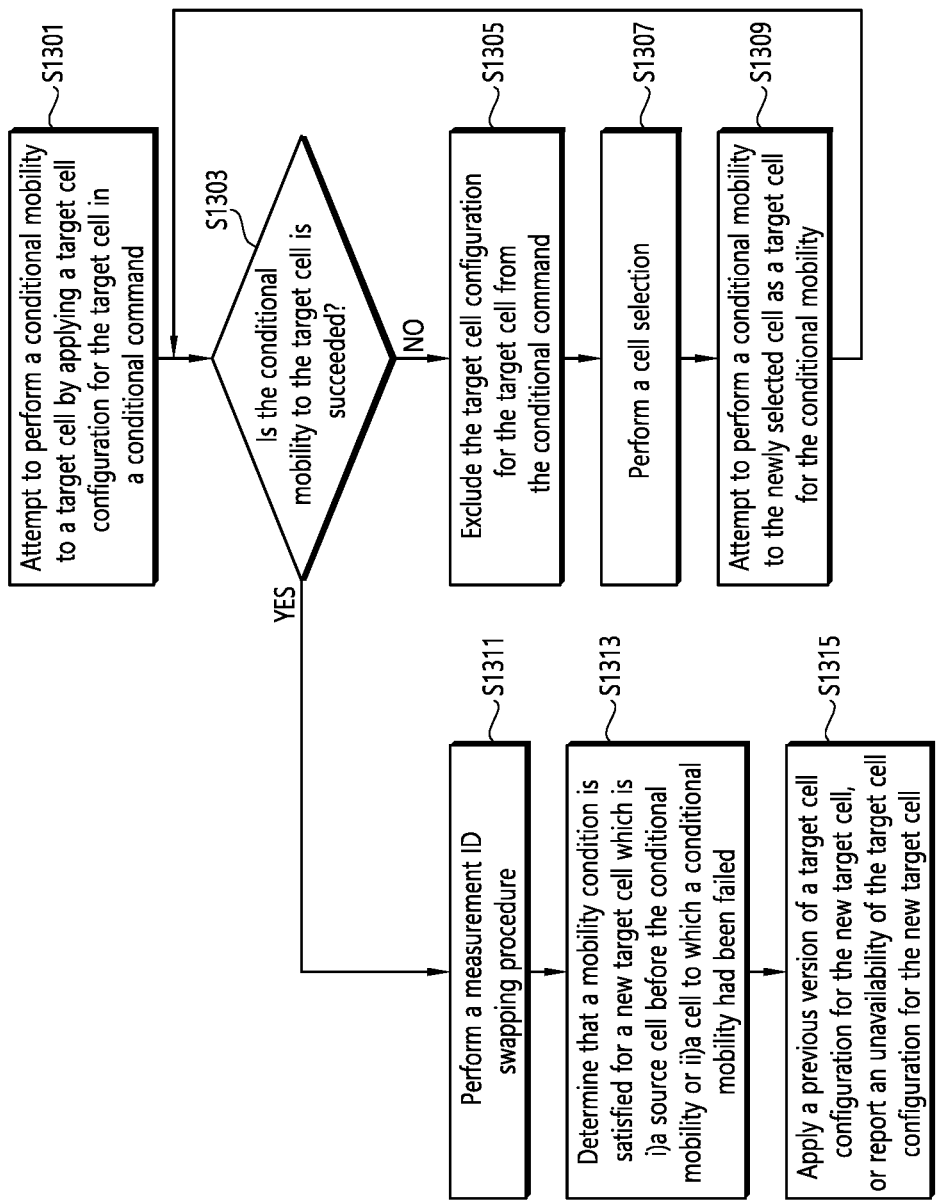
FIG. 13 shows an example of a method for a CHO command handling after completing a CHO according to an embodiment of the present disclosure.

According to various embodiments, the wireless device may receive a mobility command which has one or more target cell configurations and one or more conditions for a mobility. The wireless device may check whether a target cell configuration is available for a cell among the one or more target cells upon a condition for the mobility being met for the cell. In this case, the wireless device may i) apply a previous version of the target cell configuration for the mobility based on that the target cell configuration being not available but the UE having the previous version of the target cell configuration; and/or report measurement results to inform that there is no available target cell configuration for the cell;

FIG. 13 shows an example of a method for a CHO command handling after completing a CHO according to an embodiment of the present disclosure. In FIG. 13, descriptions regarding a handover/CHO are exemplary, and the descriptions may also be applied to a mobility/conditional mobility (e.g., SN addition and/or SN change). Steps illustrated in FIG. 13 may be performed by a wireless device and/or a UE.

Referring to FIG. 13, in step S1301, the UE may attempt to perform a conditional mobility to a target cell by applying a target cell configuration for the target cell in a conditional mobility command. The UE may receive a CHO command that is a mobility command including one or more CHO execution conditions and one or more target cell configurations including HO validity timer (i.e., T304 or T304-like timer). For the CHO execution condition, an identity (e.g., measurement ID) may be configured and the identity may be linked to/related to a measurement configuration (e.g., measurement object and/or report configuration) which has been already configured or to be configured via the CHO command for the CHO execution condition. The UE may be able to perform a CHO mobility to a target cell based on a CHO command of the target cell, if a condition specified by a measurement configuration related to a corresponding measurement identity is met while performing the measurement. When performing the CHO mobility, the UE may start the HO validity timer (e.g., T304 timer or T304-like timer). For example, the UE may start the HO validity timer upon/after receiving the CHO command. For another example, the UE may start the HO validity timer upon/after initiating the CHO mobility. For another example, the UE may start the HO validity timer upon/after determining that a mobility condition for the target cell is satisfied.

In step S1303, the UE may determine whether the CHO mobility to the target cell is succeeded. For example, if the UE cannot succeed the CHO mobility to the target cell until the expiry of the HO validity timer and the HO validity timer expires, the UE may perform step S1305. For another example, if the UE succeeds in CHO mobility to the target cell before the expiry of the HO validity timer and the UE stops the HO validity timer (i.e., HO validity timer does not expire), the UE may perform step 1311.

In step S1305, the UE may exclude the target cell configuration for the target cell from the CHO command. The UE may remove/invalidate the target cell configuration for the target cell. As a consequence of step S1307, the target cell configuration for the target cell may become unavailable.

In step S1307, the UE may perform a cell selection. The UE may not remove the corresponding (measurement) identity (e.g., measID), because the identity was just reused from the current measurement configuration but the UE may not perform measurement for the identity for which the CHO is failed.

In step S1309, if a newly selected cell is one of target cells in the CHO command, the UE may perform the CHO mobility again to the newly selected cell, and the UE may start the HO validity timer again. Then, the UE may go back to step S1303.

In step S1311, the UE may perform a measurement configuration/ID swapping procedure. The UE may swap measurement configurations that are related to the source cell and the target cell, as illustrated in FIGS. 11A, B and C. For example, if the measurement configurations are related to the target cell before performing the CHO, the measurement configurations may be changed for a source frequency. That is, among all measId list, if any measId links the measurement object of the source cell before the CHO to a measurement configuration, the measId may change the linking to the measurement object of the target cell before the CHO. If the measurement configurations are related to the source cell before performing the CHO, the measurement configurations may be changed for a target frequency (i.e., new source cell after CHO). In case there are no measurement configurations of the target cell, the UE may remove the measurement configurations which are related to the source cell.

In step S1313, after the procedure of measurement configuration swapping, the UE may keep performing a measurement to check whether any CHO execution condition is met according to the CHO command. When a certain CHO execution condition for a new target cell is met for the existing CHO command before the network provides an updated CHO command, the UE may check that there is stored target cell configuration in the CHO command. If the new target cell is the source cell before the CHO or the target cell for which the CHO mobility was failed and which was excluded by the expiry of the HO validity timer in the previous CHO procedure, the UE cannot perform the CHO mobility because there is no target cell configuration to comply/apply.

In step S1315, the UE may check that any stored target cell configuration which may not be received by the CHO command exists, and the UE may apply a previous version of the target cell configuration for the CHO mobility procedure. As another option, the UE may report measurement results and/or perform measurement reporting, to indicate that the UE is ready to perform a mobility to a cell but there is no available target cell configuration for the cell.

As described above, the UE may consider one or more target cells which satisfied a mobility condition as triggered cells, and may select one of the triggered cells as the selected cell for conditional reconfiguration execution. Upon selecting one target candidate cell for conditional reconfiguration, the UE shall:

1> if the UE is able to comply with the stored RRCReconfiguration (i.e., target cell configuration) of conditional reconfiguration for the selected cell:
2> apply the stored RRCReconfiguration and perform a mobility to the selected cell;
1> else:
2> if the UE is able to comply with any available version of RRCReconfiguration for the selected cell:
3> apply the available version of RRCReconfiguration and perform a mobility to the selected cell;
2> if the UE is capable to report the measurement result to indicate that the UE is not able to comply with the stored RRCReconfiguration of conditional reconfiguration for the selected cell:
3> initiate the measurement reporting procedure;
2> else:
3> perform the reconfiguration failure procedure.

Figure 14:
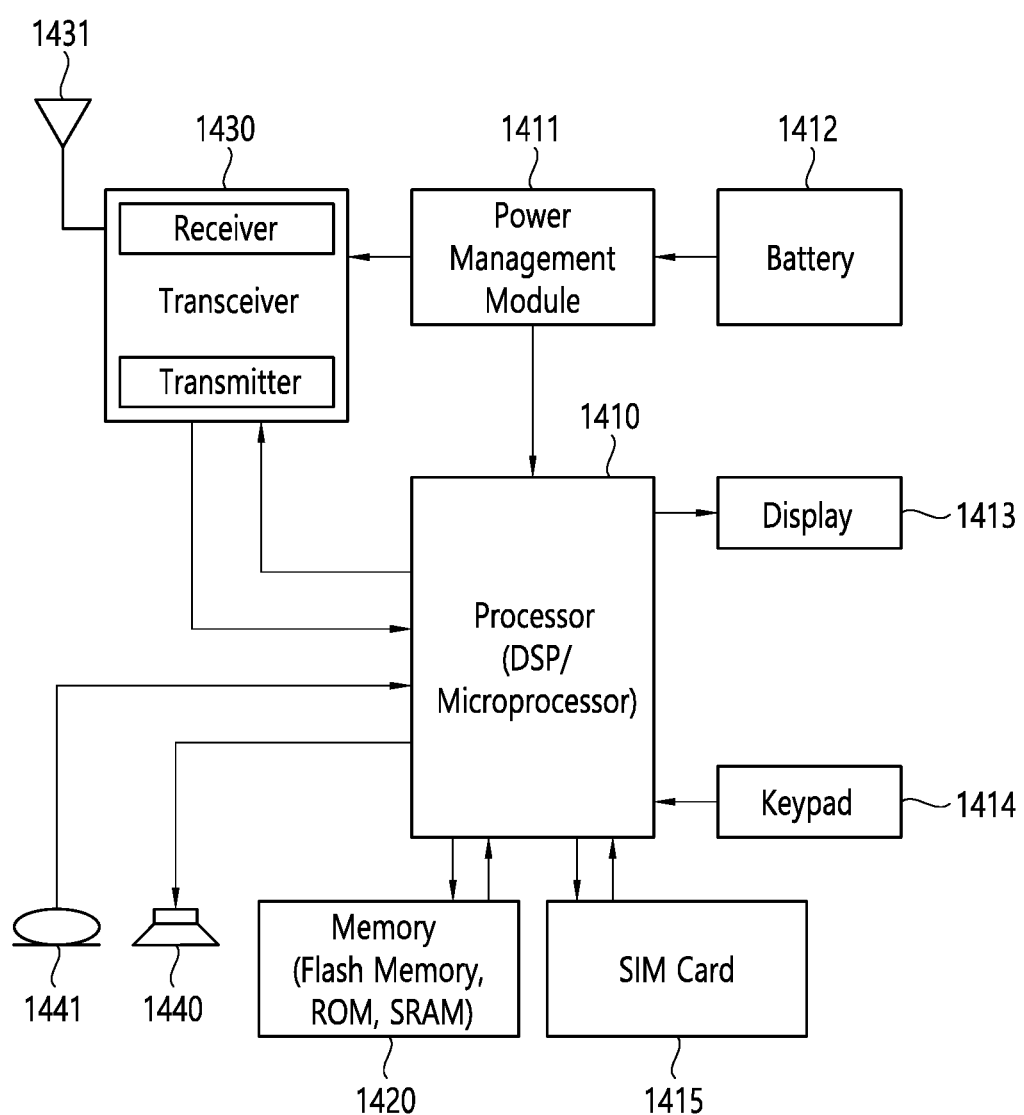
FIG. 14 shows a UE to implement an embodiment of the present disclosure. The present disclosure described above for UE side may be applied to this embodiment.

For measurement reporting, the UE shall:
1> if the reportType is set to condTriggerConfig (i.e., if a condition informed by measId is set to a mobility condition); and if the UE is not able to comply with and/or apply the stored RRCReconfiguration of conditional reconfiguration for the selected cell:
2> set the measId to the measurement identity that triggered the conditional reconfiguration;
2> include the selected cell for the conditional reconfiguration;
2> set the failureCause to the value noCellConfiguration;

FIG. 14 shows a UE to implement an embodiment of the present disclosure. The present disclosure described above for UE side may be applied to this embodiment. The UE in FIG. 14 may be an example of first device 214 as illustrated in FIG. 2.

A UE includes a processor 1410 (i.e., processor 211), a power management module 1411, a battery 1412, a display 1413, a keypad 1414, a subscriber identification module (SIM) card 1415, a memory 1420 (i.e., memory 212), a transceiver 1430 (i.e., transceiver 213), one or more antennas 1431, a speaker 1440, and a microphone 1441.

A UE includes a processor 1410, a power management module 1411, a battery 1412, a display 1413, a keypad 1414, a subscriber identification module (SIM) card 1415, a memory 1420, a transceiver 1430, one or more antennas 1431, a speaker 1440, and a microphone 1441.

The processor 1410 may be configured to implement proposed functions, procedures and/or methods described in this description. Layers of the radio interface protocol may be implemented in the processor 1410. The processor 1410 may include application-specific integrated circuit (ASIC), other chipset, logic circuit and/or data processing device. The processor 1410 may be an application processor (AP). The processor 1410 may include at least one of a digital signal processor (DSP), a central processing unit (CPU), a graphics processing unit (GPU), a modem (modulator and demodulator). An example of the processor 1410 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1410 may be configured to, or configured to control the transceiver 1430 to implement steps performed by the UE and/or the wireless device throughout the disclosure.

The power management module 1411 manages power for the processor 1410 and/or the transceiver 1430. The battery 1412 supplies power to the power management module 1411. The display 1413 outputs results processed by the processor 1410. The keypad 1414 receives inputs to be used by the processor 1410. The keypad 1414 may be shown on the display 1413. The SIM card 1415 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1420 is operatively coupled with the processor 1410 and stores a variety of information to operate the processor 1410. The memory 1420 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1420 and executed by the processor 1410. The memory 1420 can be implemented within the processor 1410 or external to the processor 1410 in which case those can be communicatively coupled to the processor 1410 via various means as is known in the art.

The transceiver 1430 is operatively coupled with the processor 1410, and transmits and/or receives a radio signal. The transceiver 1430 includes a transmitter and a receiver. The transceiver 1430 may include baseband circuitry to process radio frequency signals. The transceiver 1430 controls the one or more antennas 1431 to transmit and/or receive a radio signal.

The speaker 1440 outputs sound-related results processed by the processor 1410. The microphone 1441 receives sound-related inputs to be used by the processor 1410.

According to various embodiments, the processor 1410 may be configured to, or configured to control the transceiver 1430 to implement steps performed by the UE and/or the wireless device throughout the disclosure. For example, the processor 1410 may configured to identify a first cell which satisfies a mobility condition for the first cell included in a conditional mobility command of the first cell. The processor 1410 may configured to control the transceiver 1430 to transmit, based on a determination that a target cell configuration for the first cell is unavailable, a report comprising information for an unavailability of the target cell configuration for the first cell.

Figure 15:
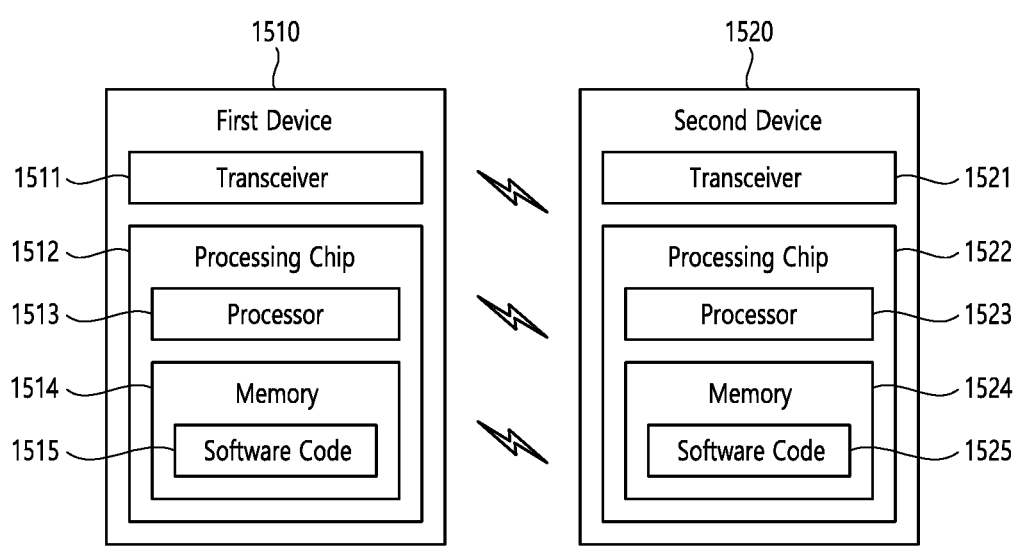
FIG. 15 shows another example of a wireless communication system to which the technical features of the present disclosure can be applied.

FIG. 15 shows another example of a wireless communication system to which the technical features of the present disclosure can be applied.

Referring to FIG. 15, the wireless communication system may include a first device 1510 (i.e., first device 210) and a second device 1520 (i.e., second device 220).

The first device 1510 may include at least one transceiver, such as a transceiver 1511, and at least one processing chip, such as a processing chip 1512. The processing chip 1512 may include at least one processor, such as a processor 1513, and at least one memory, such as a memory 1514. The memory may be operably connectable to the processor 1513.

The memory 1514 may store various types of information and/or instructions. The memory 1514 may store a software code 1515 which implements instructions that, when executed by the processor 1513, perform operations of the first device 910 described throughout the disclosure. For example, the software code 1515 may implement instructions that, when executed by the processor 1513, perform the functions, procedures, and/or methods of the first device 1510 described throughout the disclosure. For example, the software code 1515 may control the processor 1513 to perform one or more protocols. For example, the software code 1515 may control the processor 1513 to perform one or more layers of the radio interface protocol.

The second device 1520 may include at least one transceiver, such as a transceiver 1521, and at least one processing chip, such as a processing chip 1522. The processing chip 1522 may include at least one processor, such a processor 1523, and at least one memory, such as a memory 1524. The memory may be operably connectable to the processor 1523. The memory 1524 may store various types of information and/or instructions. The memory 1524 may store a software code 1525 which implements instructions that, when executed by the processor 1523, perform operations of the second device 1520 described throughout the disclosure. For example, the software code 1525 may implement instructions that, when executed by the processor 1523, perform the functions, procedures, and/or methods of the second device 1520 described throughout the disclosure. For example, the software code 1525 may control the processor 1523 to perform one or more protocols. For example, the software code 1525 may control the processor 1523 to perform one or more layers of the radio interface protocol.

According to various embodiments, the first device 1510 as illustrated in FIG. 15 may comprise a wireless device. The wireless device may comprise a transceiver 1511, a processing chip 1512. The processing chip 1512 may comprise a processor 1513, and a memory 1514. The memory 1514 may be operably connectable to the processor 1513. The memory 1514 may store various types of information and/or instructions. The memory 1514 may store a software code 1515 which implements instructions that, when executed by the processor 1513, perform operations comprising: identifying a first cell which satisfies a mobility condition for the first cell included in a conditional mobility command of the first cell; and based on a determination that a target cell configuration for the first cell is unavailable, transmitting a report comprising information for an unavailability of the target cell configuration for the first cell.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 16:
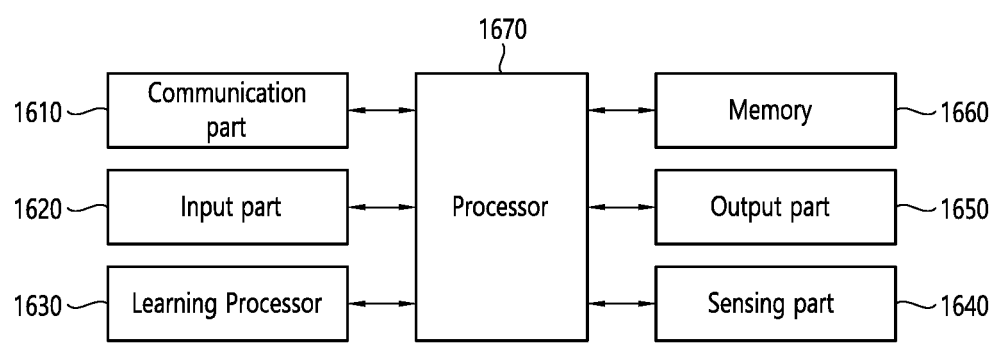
FIG. 16 shows an example of an AI device to which the technical features of the present disclosure can be applied.

FIG. 16 shows an example of an AI device to which the technical features of the present disclosure can be applied.

The AI device 1600 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 16, the AI device 1600 may include a communication part 1610, an input part 1620, a learning processor 1630, a sensing part 1640, an output part 1650, a memory 1660, and a processor 1670.

The communication part 1610 can transmit and/or receive data to and/or from external devices such as the AI devices and the AI server using wire and/or wireless communication technology. For example, the communication part 1610 can transmit and/or receive sensor information, a user input, a learning model, and a control signal with external devices. The communication technology used by the communication part 1610 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1620 can acquire various kinds of data. The input part 1620 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1620 can acquire input data to be used when acquiring an output using learning data and a learning model for model learning. The input part 1620 may obtain raw input data, in which case the processor 1670 or the learning processor 1630 may extract input features by preprocessing the input data.

The learning processor 1630 may learn a model composed of an ANN using learning data. The learned ANN can be referred to as a learning model. The learning model can be used to infer result values for new input data rather than learning data, and the inferred values can be used as a basis for determining which actions to perform. The learning processor 1630 may perform AI processing together with the learning processor of the AI server. The learning processor 1630 may include a memory integrated and/or implemented in the AI device 1600. Alternatively, the learning processor 1630 may be implemented using the memory 1660, an external memory directly coupled to the AI device 1600, and/or a memory maintained in an external device.

The sensing part 1640 may acquire at least one of internal information of the AI device 1600, environment information of the AI device 1600, and/or the user information using various sensors. The sensors included in the sensing part 1640 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1650 may generate an output related to visual, auditory, tactile, etc. The output part 1650 may include a display unit for outputting visual information, a speaker for outputting auditory information, and/or a haptic module for outputting tactile information.

The memory 1660 may store data that supports various functions of the AI device 1600. For example, the memory 1660 may store input data acquired by the input part 1620, learning data, a learning model, a learning history, etc.

The processor 1670 may determine at least one executable operation of the AI device 1600 based on information determined and/or generated using a data analysis algorithm and/or a machine learning algorithm. The processor 1670 may then control the components of the AI device 1600 to perform the determined operation. The processor 1670 may request, retrieve, receive, and/or utilize data in the learning processor 1630 and/or the memory 1660, and may control the components of the AI device 1600 to execute the predicted operation and/or the operation determined to be desirable among the at least one executable operation. The processor 1670 may generate a control signal for controlling the external device, and may transmit the generated control signal to the external device, when the external device needs to be linked to perform the determined operation. The processor 1670 may obtain the intention information for the user input and determine the user's requirements based on the obtained intention information. The processor 1670 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1630 and/or learned by the learning processor of the AI server, and/or learned by their distributed processing. The processor 1670 may collect history information including the operation contents of the AI device 1600 and/or the user's feedback on the operation, etc. The processor 1670 may store the collected history information in the memory 1660 and/or the learning processor 1630, and/or transmit to an external device such as the AI server. The collected history information can be used to update the learning model. The processor 1670 may control at least some of the components of AI device 1600 to drive an application program stored in memory 1660. Furthermore, the processor 1670 may operate two or more of the components included in the AI device 1600 in combination with each other for driving the application program.

Figure 17:
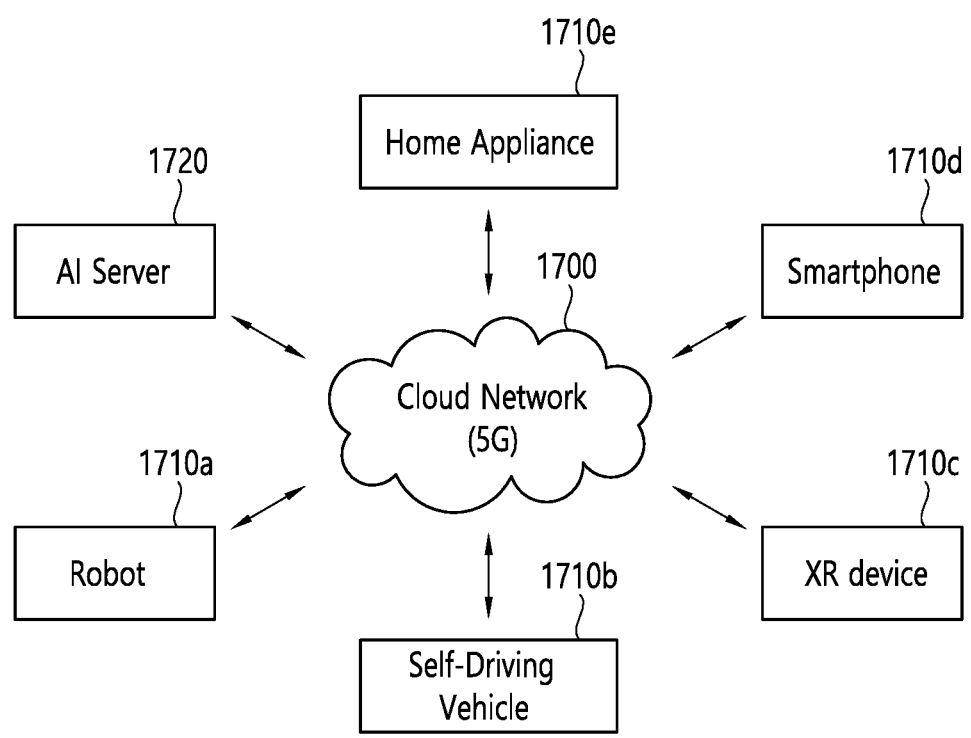
FIG. 17 shows an example of an AI system to which the technical features of the present disclosure can be applied.

FIG. 17 shows an example of an AI system to which the technical features of the present disclosure can be applied.

Referring to FIG. 17, in the AI system, at least one of an AI server 1720, a robot 1710*a*, an autonomous vehicle 1710*b*, an XR device 1710*c*, a smartphone 1710*d* and/or a home appliance 1710*e* is connected to a cloud network 1700. The robot 1710*a*, the autonomous vehicle 1710*b*, the XR device 1710*c*, the smartphone 1710*d*, and/or the home appliance 1710*e* to which the AI technology is applied may be referred to as AI devices 1710*a* to 1710*e*.

The cloud network 1700 may refer to a network that forms part of a cloud computing infrastructure and/or resides in a cloud computing infrastructure. The cloud network 1700 may be configured using a 3G network, a 4G or LTE network, and/or a 5G network. That is, each of the devices 1710*a* to 1710*e* and 1720 consisting the AI system may be connected to each other through the cloud network 1700. In particular, each of the devices 1710*a* to 1710*e* and 1720 may communicate with each other through a base station, but may directly communicate with each other without using a base station.

The AI server 1720 may include a server for performing AI processing and a server for performing operations on big data. The AI server 1720 is connected to at least one or more of AI devices constituting the AI system, i.e. the robot 1710*a*, the autonomous vehicle 1710*b*, the XR device 1710*c*, the smartphone 1710*d* and/or the home appliance 1710*e* through the cloud network 1700, and may assist at least some AI processing of the connected AI devices 1710*a* to 1710*e*. The AI server 1720 can learn the ANN according to the machine learning algorithm on behalf of the AI devices 1710*a* to 1710*e*, and can directly store the learning models and/or transmit them to the AI devices 1710*a* to 1710*e*. The AI server 1720 may receive the input data from the AI devices 1710*a* to 1710*e*, infer the result value with respect to the received input data using the learning model, generate a response and/or a control command based on the inferred result value, and transmit the generated data to the AI devices 1710*a* to 1710*e*. Alternatively, the AI devices 1710*a* to 1710*e* may directly infer a result value for the input data using a learning model, and generate a response and/or a control command based on the inferred result value.

Various embodiments of the AI devices 1710*a* to 1710*e* to which the technical features of the present disclosure can be applied will be described. The AI devices 1710*a* to 1710*e* shown in FIG. 17 can be seen as specific embodiments of the AI device 1600 shown in FIG. 16.

In the description above, a CHO has been exemplary mentioned as a conditional mobility for the sake of convenience. The present disclosure can also be applied to other forms of conditional mobility, such as conditional PSCell change/addition without loss of generality. Furthermore, the present disclosure can also be applied to normal mobility instead of conditional mobility.

The present disclosure can have various advantageous effects.

For example, the present disclosure resolves to prevent unnecessary invalid handling when a mobility condition for a candidate target cell is met without the corresponding target cell configuration after successful mobility such as CHO. Also, the UE doesn't have to perform RRC re-establishment procedure which cause data interruption by invalid case handling.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a user equipment (UE) in a wireless communication system, the method comprising:
   receiving, from a network, one or more measurement configurations;
   receiving, from the network after receiving the one or more measurement configurations, a plurality of conditional mobility commands each of which is related to a corresponding target cell among multiple target cells,
   wherein each conditional mobility command comprises a mobility condition and a target cell configuration for the corresponding target cell,
   wherein the mobility condition is related to a measurement configuration and corresponds to a condition identified by the measurement configuration, and
   wherein the target cell configuration is used for the UE to access to the corresponding target cell for mobility;
   evaluating a mobility condition for one or more of the multiple target cells including a first target cell;
   performing a mobility attempt to the first target cell using a target cell configuration for the first target cell based on a mobility condition for the first target cell being satisfied;
   removing the target cell configuration for the first target cell and performing a cell selection based on the mobility attempt to the first target cell failing;
   performing a mobility attempt to a second target cell among the multiple target cells based on the second target cell being selected according to the cell selection;
   evaluating a mobility condition for one or more of the multiple target cells including the first target cell after succeeding the mobility attempt to the second target cell; and
   transmitting, to the network, a measurement report comprising a measurement result for the first target cell based on the mobility condition for the first target cell for which target cell configuration has been removed being satisfied.

2. The method of claim 1, further comprising:
   after succeeding the mobility attempt to the second target cell, performing a measurement identity swapping so that a measurement object related to a source frequency is swapped with that related to a target frequency.

3. The method of claim 1, wherein the measurement report further comprises measurement results on one or more other cells.

4. The method of claim 1, wherein the UE is in communication with at least one of a network, or autonomous vehicles.

5. A user equipment (UE) in a wireless communication system, the UE comprising:
   a transceiver;
   a memory; and
   at least one processor operatively coupled to the transceiver and the memory, and configured to:
   control the transceiver to receive, from a network, one or more measurement configurations;
   control the transceiver to receive, from the network after receiving the one or more measurement configurations, a plurality of conditional mobility commands each of which is related to a corresponding target cell among multiple target cells,
   wherein each conditional mobility command comprises a mobility condition and a target cell configuration for the corresponding target cell,
   wherein the mobility condition is related to a measurement configuration and corresponds to a condition identified by the measurement configuration, and
   wherein the target cell configuration is used for the UE to access to the corresponding target cell for mobility;
   evaluate a mobility condition for one or more of the multiple target cells including a first target cell;
   perform a mobility attempt to the first target cell using a target cell configuration for the first target cell based on a mobility condition for the first target cell being satisfied;
   remove the target cell configuration for the first target cell and performing a cell selection based on the mobility attempt to the first target cell failing;
   perform a mobility attempt to a second target cell among the multiple target cells based on the second target cell being selected according to the cell selection;
   evaluate a mobility condition for one or more of the multiple target cells including the first target cell after succeeding the mobility attempt to the second target cell; and control the transceiver to transmit, to the network, a measurement report comprising a measurement result for the first target cell based on the mobility condition for the first target cell for which target cell configuration has been removed being satisfied.

6. The UE of claim 5, wherein the at least one processor is further configured to, after succeeding the mobility attempt to the second target cell, perform a measurement identity swapping so that a measurement object related to a source frequency is swapped with that related to a target frequency.

7. A computer-readable medium having recorded thereon a program for performing each step of a method on a computer, the method comprising:
  receiving, from a network, one or more measurement configurations;
  receiving, from the network after receiving the one or more measurement configurations, a plurality of conditional mobility commands each of which is related to a corresponding target cell among multiple target cells,
  wherein each conditional mobility command comprises a mobility condition and a target cell configuration for the corresponding target cell,
  wherein the mobility condition is related to a measurement configuration and corresponds to a condition identified by the measurement configuration, and
  wherein the target cell configuration is used for the UE to access to the corresponding target cell for mobility;
  evaluating a mobility condition for one or more of the multiple target cells including a first target cell;
  performing a mobility attempt to the first target cell using a target cell configuration for the first target cell based on a mobility condition for the first target cell being satisfied;
  removing the target cell configuration for the first target cell and performing a cell selection based on the mobility attempt to the first target cell failing;
  performing a mobility attempt to a second target cell among the multiple target cells based on the second target cell being selected according to the cell selection;
  evaluating a mobility condition for one or more of the multiple target cells including the first target cell after succeeding the mobility attempt to the second target cell; and
  transmitting, to the network, a measurement report comprising a measurement result for the first target cell based on the mobility condition for the first target cell for which target cell configuration has been removed being satisfied.

* * * * *